(12) United States Patent
Williams et al.

(10) Patent No.: US 10,867,371 B2
(45) Date of Patent: Dec. 15, 2020

(54) FIXED PATTERN NOISE MITIGATION FOR A THERMAL IMAGING SYSTEM

(71) Applicant: Seek Thermal, Inc., Goleta, CA (US)

(72) Inventors: Ross Williams, Santa Barbara, CA (US); William J. Parrish, Santa Barbara, CA (US); Jason Wolfe, Santa Barbara, CA (US)

(73) Assignee: Seek Thermal, Inc., Goleta, CA (US)

( * ) Notice: Subject to any disclaimer, the term of this patent is extended or adjusted under 35 U.S.C. 154(b) by 11 days.

(21) Appl. No.: 16/195,593

(22) Filed: Nov. 19, 2018

(65) Prior Publication Data

US 2019/0130535 A1 May 2, 2019

Related U.S. Application Data

(63) Continuation-in-part of application No. 15/629,526, filed on Jun. 21, 2017, now Pat. No. 10,230,912.

(60) Provisional application No. 62/355,797, filed on Jun. 28, 2016.

(51) Int. Cl.
*G06T 5/00* (2006.01)
*G06T 5/10* (2006.01)
*G06T 5/20* (2006.01)

(52) U.S. Cl.
CPC .............. *G06T 5/002* (2013.01); *G06T 5/10* (2013.01); *G06T 5/20* (2013.01); *G06T 2207/10048* (2013.01); *G06T 2207/20032* (2013.01)

(58) Field of Classification Search
None
See application file for complete search history.

(56) References Cited

U.S. PATENT DOCUMENTS

| | | |
|---|---|---|
| 5,200,623 A | 4/1993 | Cannata |
| 6,140,948 A | 10/2000 | Yu |
| 6,252,995 B1 | 6/2001 | Takamori |
| 6,730,909 B2 | 5/2004 | Butler |
| 6,757,442 B1 | 6/2004 | Avinash |
| 7,035,475 B1 | 4/2006 | Chen |
| 7,592,577 B1 | 9/2009 | Liu |
| 7,772,557 B2 | 8/2010 | Anderson |

(Continued)

FOREIGN PATENT DOCUMENTS

| | | |
|---|---|---|
| EP | 1 083 740 | 3/2001 |
| EP | 1 601 185 | 11/2005 |

(Continued)

OTHER PUBLICATIONS

Sunkari Sridhar et al, A New Approach for Generalised Unsharp Masking Alogorithm, IJRET 2013 (Year: 2013).*

(Continued)

*Primary Examiner* — Mark Roz
(74) *Attorney, Agent, or Firm* — Knobbe Martens Olson & Bear LLP

(57) ABSTRACT

An imaging system whose Field of View FOV experiences occasional motion in relation to viewed scenes may be configured to reduce Fixed Pattern Noise (FPN) of acquired image data. FPN may be reduced by developing a pixel by pixel FPN correction term through a series of steps including blurring the image, identifying pixels to exclude from some calculations, a motion detector and an FPN updater for frames under motion and an FPN decay element for frames that are still.

20 Claims, 15 Drawing Sheets

(56) References Cited

U.S. PATENT DOCUMENTS

| | | |
|---|---|---|
| 7,795,578 B2 | 9/2010 | Högasten et al. |
| 7,796,168 B1 | 9/2010 | Kostrzewa et al. |
| 7,982,652 B2 | 7/2011 | Simony et al. |
| 7,995,859 B2 | 8/2011 | Högasten |
| 8,189,050 B1 | 5/2012 | Hughes et al. |
| 8,208,026 B2 | 6/2012 | Högasten et al. |
| 8,208,755 B1 | 6/2012 | Högasten |
| 8,306,275 B2 | 11/2012 | Högasten |
| 8,340,414 B2 | 12/2012 | Högasten et al. |
| 8,373,757 B1 | 2/2013 | Nguyen |
| 8,378,290 B1 | 2/2013 | Speake et al. |
| 8,428,385 B2 | 4/2013 | Whiteside et al. |
| 8,503,821 B2 | 8/2013 | Högasten |
| 8,515,196 B1 | 8/2013 | Högasten |
| 8,582,890 B2 | 11/2013 | Liba |
| 8,737,760 B2 | 5/2014 | Olsson et al. |
| 8,780,208 B2 | 7/2014 | Högasten et al. |
| 9,332,186 B2 | 5/2016 | Johansson et al. |
| 9,335,352 B2 | 5/2016 | McCrea et al. |
| 9,380,245 B1 | 6/2016 | Guidash |
| 2001/0042825 A1 | 11/2001 | Young |
| 2002/0022938 A1 | 2/2002 | Butler |
| 2002/0074499 A1 | 6/2002 | Butler |
| 2002/0146345 A1 | 10/2002 | Neilson |
| 2004/0012676 A1 | 1/2004 | Weiner |
| 2004/0032516 A1 | 2/2004 | Kakarala |
| 2004/0051798 A1 | 3/2004 | Kakarala |
| 2004/0239782 A1 | 12/2004 | Equitz |
| 2005/0099504 A1 | 5/2005 | Nayar |
| 2005/0179468 A1 | 8/2005 | Zhou |
| 2006/0092297 A1 | 5/2006 | Lee et al. |
| 2006/0113459 A1 | 6/2006 | Yang et al. |
| 2006/0139198 A1 | 6/2006 | Rao et al. |
| 2006/0193509 A1 | 8/2006 | Criminisi |
| 2007/0147698 A1 | 6/2007 | Reid |
| 2008/0107346 A1 | 5/2008 | Zhang |
| 2008/0266413 A1 | 10/2008 | Cohen |
| 2009/0073278 A1 | 3/2009 | Ogawa et al. |
| 2009/0273675 A1 | 11/2009 | Jonsson |
| 2010/0019128 A1 | 1/2010 | Itzler |
| 2010/0039306 A1 | 2/2010 | Simony et al. |
| 2010/0141768 A1 | 6/2010 | Liberman et al. |
| 2010/0165122 A1 | 7/2010 | Castorina |
| 2010/0238294 A1 | 9/2010 | Högasten et al. |
| 2011/0141368 A1 | 6/2011 | Wallace et al. |
| 2012/0070081 A1 | 3/2012 | Lukac |
| 2013/0064449 A1 | 3/2013 | Menikoff |
| 2013/0077888 A1 | 3/2013 | Meyers et al. |
| 2013/0112848 A1 | 5/2013 | Lin et al. |
| 2013/0147966 A1 | 6/2013 | Kostrzewa et al. |
| 2013/0169819 A1 | 7/2013 | Strandemar |
| 2013/0222604 A1 | 8/2013 | Ingerhed et al. |
| 2013/0242125 A1 | 9/2013 | Yang et al. |
| 2013/0250125 A1 | 9/2013 | Garrow et al. |
| 2013/0258131 A1 | 10/2013 | Hashimoto et al. |
| 2013/0268212 A1 | 10/2013 | Makarov et al. |
| 2013/0300875 A1 | 11/2013 | Strandemar et al. |
| 2014/0015921 A1 | 1/2014 | Foi et al. |
| 2014/0016879 A1 | 1/2014 | Högasten et al. |
| 2014/0037225 A1 | 2/2014 | Högasten et al. |
| 2014/0078360 A1 | 3/2014 | Park et al. |
| 2014/0092257 A1 | 4/2014 | Högasten et al. |
| 2014/0092258 A1 | 4/2014 | Dart et al. |
| 2014/0168445 A1 | 6/2014 | Högasten et al. |
| 2014/0239180 A1 | 8/2014 | Vilain |
| 2014/0247365 A1 | 9/2014 | Gardner et al. |
| 2014/0313343 A1 | 10/2014 | Frank et al. |
| 2014/0313385 A1 | 10/2014 | Sato et al. |
| 2014/0355902 A1 | 12/2014 | Olsson |
| 2014/0355904 A1 | 12/2014 | Olsson |
| 2015/0085134 A1 | 3/2015 | Novotny |
| 2015/0146009 A1 | 5/2015 | Kostrzewa et al. |
| 2015/0187144 A1 | 7/2015 | Roth |
| 2015/0310594 A1 | 10/2015 | Olsson |
| 2015/0312488 A1 | 10/2015 | Kostrzewa et al. |
| 2015/0312489 A1 | 10/2015 | Hoelter et al. |
| 2015/0316473 A1 | 11/2015 | Kester et al. |
| 2015/0319379 A1 | 11/2015 | Nussmeier et al. |
| 2015/0350567 A1 | 12/2015 | Parrish et al. |
| 2016/0041039 A1 | 2/2016 | Olsson |
| 2016/0042500 A1 | 2/2016 | Engberg et al. |
| 2016/0044306 A1 | 2/2016 | Chahine et al. |
| 2016/0056785 A1 | 2/2016 | Wolfe et al. |
| 2016/0057369 A1 | 2/2016 | Wolfe et al. |
| 2016/0061883 A1 | 3/2016 | Engberg et al. |
| 2016/0156858 A1 | 6/2016 | Lee et al. |
| 2016/0198102 A1 | 7/2016 | Chahine et al. |
| 2016/0202117 A1 | 7/2016 | Hosking |
| 2016/0203694 A1 | 7/2016 | Högasten et al. |
| 2016/0323525 A1 | 11/2016 | Lee |
| 2018/0096468 A1 | 4/2018 | Nguyen |
| 2018/0239784 A1 | 8/2018 | Solli et al. |
| 2018/0283953 A1 | 10/2018 | Frank et al. |
| 2018/0288339 A1 | 10/2018 | Wadelius |

FOREIGN PATENT DOCUMENTS

| | | |
|---|---|---|
| EP | 1667 066 | 6/2006 |
| EP | 2 157 699 | 2/2010 |
| EP | 2 618 560 | 7/2013 |
| EP | 2 645 577 | 10/2013 |
| WO | WO 2012/170949 | 12/2012 |
| WO | WO 2013/084809 | 6/2013 |
| WO | WO 2013/191611 | 12/2013 |
| WO | WO 2014/106210 | 7/2014 |

OTHER PUBLICATIONS

PCT International Search Report and Written Opinion for PCT/US2015/032671 dated Sep. 7, 2015 in 16 pages.

PCT International Search Report and Written Opinion for PCT/US042826 dated Oct. 16, 2015 in 12 pages.

PCT International Search Report and Written Opinion for PCT/US043547 dated Oct. 9, 2015 in 11 pages.

PCT International Search Report and Written Opinion for PCT/US045656 dated Oct. 21, 2015 in 12 pages.

Badamchizadeh, et al., Image and Graphics, Comparative Study of Unsharp Masking Methods for Image Enhancement, 2004, pp. 27-30.

PCT International Search Report and Written Opinion for PCT/US2015/063111 dated May 17, 2016 in 13 pages.

Dynamic-range compression and contrast enhancement in infrared imaging systems.

"The Integrator Amplifier," Electronics Tutorials, http://www.electronics-tutorials.ws/opamp/opamp_6.html, accessed Sep. 22, 2016.

Branchitta, et al. Dynamic-range compression and contrast enhancement in infrared imaging systems, Optical Engineering Jul. 2008.

Provost, Benoit et al., "On-Chip Ramp Generators for Mixed-Signal BIST and ADC Self-Test," 2003, IEEE Journal of Solid-State Circuits, 38 (2), pp. 263-273.

\* cited by examiner

204 Define FPN$_{x,y}$ Active pixels (Example)

2041
If Edge$_{x,y}$ and Peak$_{x,y}$ = False then FPN$_{x,y}$ is non excluded and FPN$_{x,y}$ = FPN$_{x,y}$(t)

↓

2042
If Edge$_{x,y}$ or Peak$_{x,y}$ = True then FPN$_{x,y}$ is excluded and FPN$_{x,y}$ = FPN$_{x,y}$(t-1)

*FIG. 9*

205 Motion Detector (Example)

2051
If |K$_{X,Y}$(t) − K$_{X,Y}$(t-1)| >/= Mot$_1$ then M$_{x,y}$ =1

↓

2052
If |K$_{X,Y}$(t) − K$_{X,Y}$(t-1)| < Mot$_1$ then M$_{x,y}$ =0

↓

2053
If sum(all M$_{x,y}$) >/= Mot$_2$ then Motion = True

↓

2054
If sum(all M$_{x,y}$) < Mot$_2$ then Motion = False

*FIG. 10*

FIXED PATTERN NOISE MITIGATION FOR A THERMAL IMAGING SYSTEM

CROSS-REFERENCE TO RELATED APPLICATIONS

This application is a continuation-in-part of U.S. application Ser. No. 15/629,526, filed Jun. 21, 2017, entitled "FIXED PATTERN NOISE MITIGATION FOR A THERMAL IMAGING SYSTEM," which claims the benefit of U.S. Provisional Application Ser. No. 62/355,797, filed Jun. 28, 2016, entitled "FIXED PATTERN NOISE MITIGATION FOR A THERMAL IMAGING SYSTEM," both of which are hereby incorporated by reference in its entirety and for all purposes.

BACKGROUND

Field

The present disclosure generally relates to Fixed Pattern Noise (FPN) reduction for imaging systems, such as cameras including in particular thermal imaging as well as visible imaging cameras, and in particular to systems and methods for developing an FPN filter that can be applied to image data.

Description of Related Art

The increasing availability of high-performance, low-cost uncooled infrared imaging devices, such as bolometer focal plane arrays (FPAs), is enabling the design and production of mass-produced, consumer-oriented infrared (IR) cameras capable of quality thermal imaging. Such thermal imaging sensors have long been expensive and difficult to produce, thus limiting the employment of high-performance, long-wave imaging to high-value instruments, such as aerospace, military, or large-scale commercial applications. Mass-produced IR cameras may have different design requirements than complex military or industrial systems. Fixed Pattern Noise in such systems may exceed acceptable levels and therefore new ways to filter out FPN may be desirable.

SUMMARY

Example embodiments described herein have innovative features, no single one of which is indispensable or solely responsible for their desirable attributes. Without limiting the scope of the claims, some of the advantageous features will now be summarized.

In some embodiments, an imaging system whose Field of View FOV experiences occasional motion in relation to viewed scenes may be configured to reduce Fixed Pattern Noise (FPN) of acquired image data. FPN may be reduced by developing a pixel by pixel FPN correction term through a series of steps including blurring the image, identifying pixels to exclude from some calculations, a motion detector and an FPN updater for frames under motion and an FPN decay element for frames that are still.

In a first aspect, a method is described for reducing Fixed Pattern Noise (FPN) in an imaging system including at least one imaging sensor and associated image signal processing chain, wherein successive frames of image pixel data are generated and passed to the image processing chain, and where the Field of View (FOV) of the imaging system is subject to occasional motion relative to imaged scenes. The method includes selecting a group of pixels $P_{x,y\ sig}$, the group of pixels $P_{x,y\ sig}$ comprising at least a portion of an image frame, applying an FPN filter to generate an FPN correction term $FPN_{x,y}$, and modifying individual pixels of $P_{x,y\ sig}$ based at least in part on $FPN_{x,y}$ from a previous image frame to generate a corrected set of pixels $P_{x,y}$ for calculating a value of $FPN_{x,y}$ for the current frame. Applying the FPN filter includes blurring at least some of the pixels of $P_{x,y}$ to create a blurred pixel set $K_{x,y}$ and saving the blurred pixel set $K_{x,y}$ for at least one following frame, wherein $K_{x,y}$ values are available for the current frame and at least one previous frame during the application of the FPN filter; identifying pixels that meet one or more predetermined criteria as excluded pixels for a current image frame; detecting image motion by comparing $K_{x,y}$ values from the current frame and the at least one previous frame; calculating, when motion is detected, an updated $FPN_{x,y}$ term based at least in part on $P_{x,y}$ and $K_{x,y}$ for current non-excluded pixels and based at least in part on previous $FPN_{x,y}$ information for currently excluded pixels; and when motion is not detected, decaying $FPN_{x,y}$ for both excluded and non-excluded pixels.

In some embodiments of the first aspect, the group of pixels, $P_{x,y\ sig}$, includes pixels at least one pixel away from the image frame boundaries. In some implementations of the first aspect, blurring at least some of the pixels $P_{x,y}$ includes applying a rolling kernel to the selected pixels, and replacing the center pixel of each kernel with a pixel value derived from nearest neighbor pixels of the center pixel to create a blurred pixel $K_{x,y}$. In some embodiments of the first aspect, creating the blurred pixel $K_{x,y}$ includes calculating at least one of a mean, a median, a scaled mean, or a scaled median of the nearest neighbor pixels.

In some embodiments of the first aspect, the kernel is a 3×3 kernel and $K_{x,y}$ is the median of the 8 pixels adjacent the center pixel in each kernel. In some embodiments of the first aspect, identifying pixels as excluded pixels includes at least one of executing an amplitude filter on at least one of at least a portion of $P_{x,y}$ or $K_{x,y}$ pixels and excluding pixels above a predetermined amplitude, or executing an edge filter on at least a portion of $P_{x,y}$ or $K_{x,y}$ pixels and excluding pixels whose edge filter results exceed a predetermined value. In some embodiments of the first aspect, the edge filter includes at least one of a high-pass filter or an X-filter. In some embodiments of the first aspect, detecting motion includes computing differences in at least a portion of the $K_{x,y}$ values from at least one previous frame to the next frame, counting the number of pixels $K_{x,y}$ exceeding a predetermined difference threshold, and determining there is motion if the number exceeds a predetermined count threshold.

In some embodiments of the first aspect, a time to corresponds to the first frame for which $FPN_{x,y}$ is calculated, a time t corresponds to the current frame, and a time t−1 to the previous frame, wherein calculating the updated $FPN_{x,y}$ includes setting $FPN_{x,y}(t_0)=0$, setting $FPN_{x,y}(t)$ to at least one of $FPN_{x,y}(t-1)+S(P_{x,y}(t)-K_{x,y}(t))$ or $FPN_{x,y}(t-1)-\text{ave}(FPN_{x,y}(t-1))+S(P_{x,y}(t)-K_{x,y}(t))$ for non-excluded pixels where motion between frames at t and t−1 is detected, setting $FPN_{x,y}(t)=FPN_{x,y}(t-1)$ for excluded pixels where motion between frames at t and t−1 is detected, where S is a predetermined scaling factor, and wherein decaying includes setting $FPN_{x,y}(t)=D*FPN_{x,y}(t-1)$ for all pixels where motion between frame at t and t−1 is not detected, where D is a predetermined decay factor.

In some embodiments of the first aspect, modifying individual pixels of $P_{x,y\ sig}$ based at least in part on $FPN_{x,y}$ from a previous image frame to generate a corrected set of pixels $P_{x,y}$, includes at least one of setting $P_{x,y}$ to $P_{x,y\ sig}$ $FPN_{x,y}(t-1)$, applying a clipping filter to at least a portion of the $P_{x,y}$ pixels, and passing the $P_{x,y}$ pixels to the other modules of the image signal processing chain.

In a second aspect, an imaging system with Fixed Pattern Noise (FPN) reduction is described. The system includes at least one imaging sensor and associated image signal processing chain, wherein successive frames of image pixel data are generated and passed to the image processing chain, and where the Field of View (FOV) of the imaging system is subject to occasional motion relative to imaged scenes. The system further includes a selection element configured to select a group of pixels $P_{x,y\ sig}$, the group of pixels $P_{x,y\ sig}$ comprising at least a portion of an image frame; an FPN filter configured to generate an FPN correction term $FPN_{x,y}$; and an FPN application element configured to modify individual pixels of $P_{x,y\ sig}$ based at least in part on $FPN_{x,y}$ from a previous image frame to generate a corrected set of pixels $P_{x,y}$ for calculating a value of $FPN_{x,y}$ for the current frame. The FPN filter includes a blurring element configured to blur at least some of the pixels of $P_{x,y}$ to create a blurred pixel set $K_{x,y}$ and to save the blurred pixel set $K_{x,y}$ for at least one following frame, wherein $K_{x,y}$ values are available for the current frame and at least one previous frame during application of the FPN filter; an exclusion element configured to identify pixels that meet one or more predetermined criteria as excluded pixels for a current image frame; a motion detection element configured to detect image motion by comparing $K_{x,y}$ values from the current frame and the at least one previous frame; an $FPN_{x,y}$ update element configured to calculate, when motion is detected, an updated $FPN_{x,y}$ term based at least in part on $P_{x,y}$ and $K_{x,y}$, for current non-excluded pixels and based at least in part on previous $FPN_{x,y}$ information for currently excluded pixels; and an $FPN_{x,y}$ decay element configured to decay, when motion is not detected, $FPN_{x,y}$ for both excluded and non-excluded pixels.

In some embodiments of the second aspect, the group of pixels, $P_{x,y}$ includes pixels at least one pixel away from the image frame boundaries. In some implementations of the second aspect, the blurring element is configured to apply a rolling kernel to the selected pixels, and replace the center pixel of each kernel with a pixel value derived from nearest neighbor pixels of the center pixel to create a blurred pixel $K_{x,y}$. In some embodiments of the second aspect, the blurring element is configured to create the blurred pixel $K_{x,y}$ by calculating at least one of a mean, a median, a scaled mean, or a scaled median of the nearest neighbor pixels.

In some embodiments of the second aspect, the kernel is a 3×3 kernel and $K_{x,y}$ is the median of the 8 pixels adjacent the center pixel in each kernel. In some embodiments of the second aspect, the exclusion element is configured to at least one of: execute an amplitude filter on at least one of at least a portion of $P_{x,y}$ or $K_{x,y}$ pixels and exclude pixels above a predetermined amplitude, or execute an edge filter on at least a portion of $P_{x,y}$ or $K_{x,y}$ pixels and exclude pixels whose edge filter results exceed a predetermined value.

In some embodiments of the second aspect, the edge filter includes at least one of a high-pass filter or an X-filter. In some embodiments of the second aspect, the motion detection element is configured to compute differences in at least a portion of the $K_{x,y}$ values from at least one previous frame to the next frame, count the number of pixels $K_{x,y}$ exceeding a predetermined difference threshold, and determine there is motion if the number exceeds a predetermined count threshold.

In some embodiments of the second aspect, a time to corresponds to the first frame for which $FPN_{x,y}$ is calculated, a time t corresponds to the current frame, and a time t−1 to the previous frame, wherein the update $FPN_{x,y}$ element is configured to set $FPN_{x,y}(t_0)=0$, set $FPN_{x,y}(t)$ to at least one of $FPN_{x,y}(t-1)+S(P_{x,y}(t)-K_{x,y}(t))$ or $FPN_{x,y}(t-1)-ave(FPN_{x,y}(t-1))+S(P_{x,y}(t)-K_{x,y}(t))$ for non-excluded pixels where motion between frames at t and t−1 is detected, where S is a predetermined scaling factor, and set $FPN_{x,y}(t)=FPN_{x,y}(t-1)$ for excluded pixels where motion between frames at t and t−1 is detected, and wherein the decay element is configured to set $FPN_{x,y}(t)=D*FPN_{x,y}(t-1)$ for all pixels where motion between frame at t and t−1 is not detected, where D is a predetermined decay factor.

In some embodiments of the first aspect, the apply $FPN_{x,y}$ element is configured to generate the set of pixels $P_{x,y}$ by at least one of setting $P_{x,y}$ to $P_{x,y\ sig}-FPN_{x,y}(t-1)$, applying a clipping filter to at least a portion of the $P_{x,y}$ pixels, and passing the $P_{x,y}$ pixels to the other modules of the image signal processing chain.

BRIEF DESCRIPTION OF THE DRAWINGS

Aspects and advantages of the embodiments provided herein are described with reference to the following detailed description in conjunction with the accompanying drawings. Throughout the drawings, reference numbers may be re-used to indicate correspondence between referenced elements. The drawings are provided to illustrate example embodiments described herein and are not intended to limit the scope of the disclosure.

FIG. 9 illustrates an example define active FPN pixels element.

FIG. 10 illustrates an example motion detector element.

DETAILED DESCRIPTION

Figure 1A:
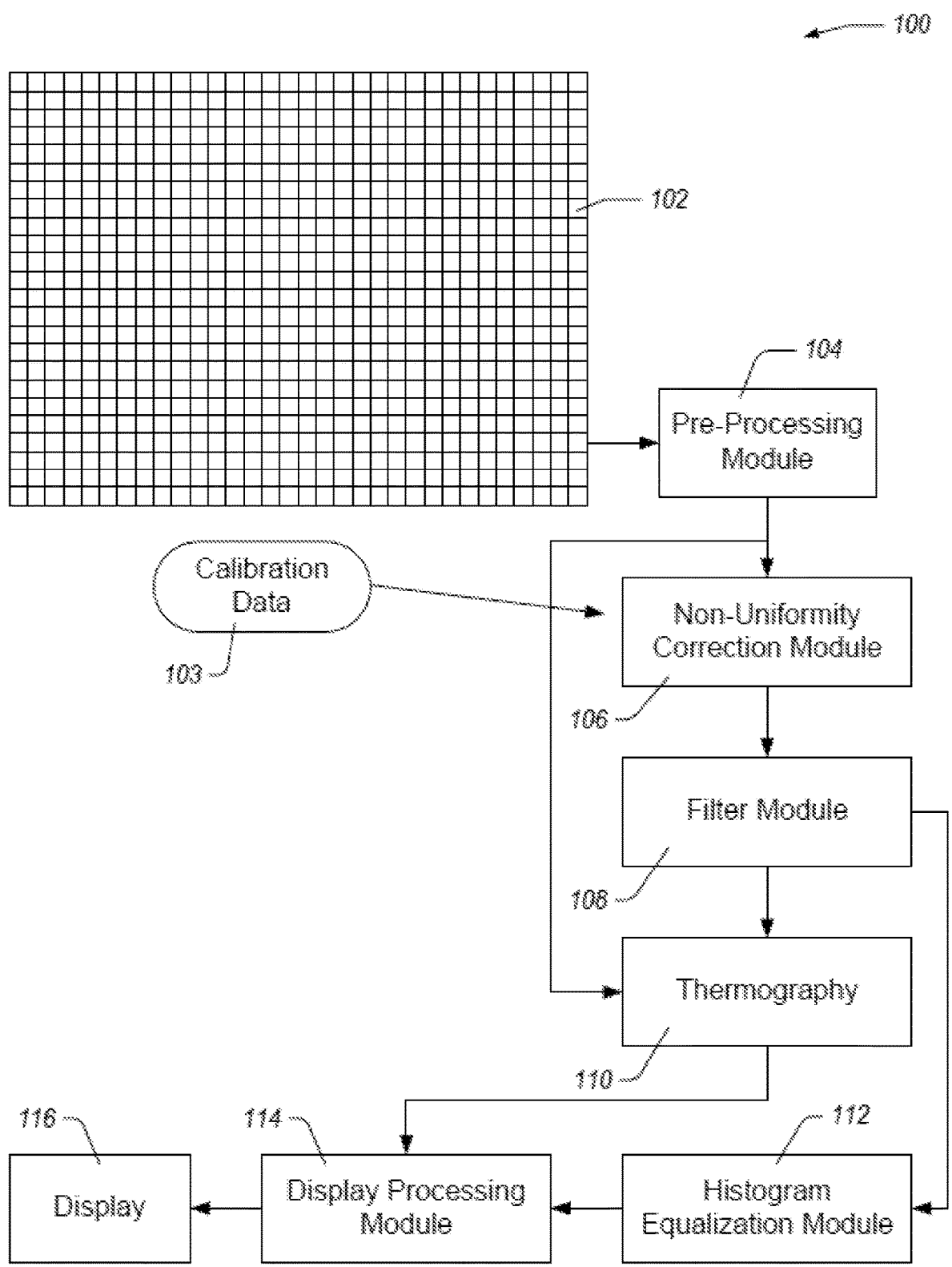
FIG. 1A illustrates a functional block diagram of an example imaging system.

Generally described, aspects of the present disclosure relate to reducing or mitigating the effect of Fixed Pattern Noise (FPN) on image quality for an imaging system. These aspects relate to imaging systems that whose Field of View and/or the content of scenes viewed by the imaging system are not constant. For example, there may be, at least occasionally, motion in the images of some sort, resulting in features in a scene changing their position in successive images, for example. For such imaging systems, image motion can aid in FPN mitigation. The present disclosure includes systems and methods to reduce the impact of FPN on image data. For example, an FPN filter may be applied to image data and the FPN filter may rely at least partially on image motion. These systems and methods can use the FPN filter in combination with other image processing functions to present a clearer, easier to interpret image to a user. These systems and methods are applicable to any imaging system, and may be particularly applicable to systems which include thermal imaging sensors. In some embodiments, the thermal imaging sensor data undergoes processing by a substantial series of image processing steps to correct for the lack of uniformity, stability over time, and low signal to noise characteristics common to many thermal imaging sensors. FPN is also potentially an issue in thermal imaging. In some embodiments, it may be advantageous to apply an FPN filter early in the image processing steps.

Examples and implementations described herein focus, for the purpose of illustration and not for limitation, on an imaging system including an infrared camera or sensor using a focal plane array. Various aspects of the disclosure will now be described with regard to certain examples and embodiments, which are intended to illustrate but not limit the disclosure. For many of these aspects, the non-limiting example embodiments will describe an imaging system where the thermal sensor delivers image data to one or more processors which execute a series of image processing steps, which include the elements for FPN mitigation.

Some embodiments described herein provide for using motion over time of image features to develop and update an FPN filter. Advantageously, this may allow for convenient and timely application for such systems where image motion is often prevalent.

Some embodiments described herein provide for applying the an FPN filter early in the image processing operations. Advantageously, this may allow for reduced subsequent processing in many cases.

Some embodiments described herein provide for suppression of FPN while maintaining fidelity for image features such as edges and hot spots. Advantageously, this may allow for clearer appearing images with little distortion of high contrast image features.

The disclosed FPN mitigation methods may be implemented as modules or elements that may be a programmed computer method or a digital logic method and may be implemented using a combination of any of a variety of analog and/or digital discrete circuit components (transistors, resistors, capacitors, inductors, diodes, etc.), programmable logic, microprocessors, microcontrollers, application-specific integrated circuits, or other circuit elements. A memory configured to store computer programs or computer-executable instructions may be implemented along with discrete circuit components to carry out one or more of the methods described herein. In certain implementations, the disclosed methods may be implemented in conjunction with a one or more focal plane arrays (FPA) on a camera core, wherein the processor and memory components executing the disclosed methods may be on a processing device mated to the camera core, such as a mobile appliance including smart phones, tablets, personal computers, etc. In some implementations, the processing and memory elements of the imaging system may be in programmable logic or on-board processors that are part of the core or camera system. In some embodiments, pixel mapping, edge detection, and image combining may be accomplished on a processing element on the camera core, and further image processing and display may be accomplished by a system controller mated to the core. In general, digital control functions, image acquisition, image processing, and image display/analysis may be distributed across one or more digital elements or processors. Referring to a system processor or any controller in any of the disclosed embodiments should not be interpreted as implying the control and processing functionality resides in a single element.

As a particular example of some advantages provided by the disclosed systems and methods, an imaging system can include a thermal imaging focal plane array (FPA) configured to acquire images of a scene. The FPA can include a two-dimensional array of N detectors, the FPA configured to output a two-dimensional image of the scene. For imaging purposes, image frames, typically data from all or some of the detectors $N_f$, are produced by the FPA, each successive frame containing data from the array captured in successive time windows. Thus, a frame of data delivered by the FPA comprises $N_f$ digital words, each word representing a particular pixel, $P_{x,y\ signal}$, in the image. These digital words are usually of a length determined by the analog to digital conversion (A/D) process. For example, if the pixel data is converted with a 14 bit A/D, the pixel words may be 14 bits in length, and there may be 16384 counts per word. For an IR camera used as a thermal imaging system, these words may correspond to an intensity of radiation measured by each pixel in the array. In a particular example, for a bolometer IR FPA the intensity per pixel usually corresponds to temperature of the corresponding part of the imaged scene, with lower values corresponding to colder regions and higher values to hotter regions. It may be desirable to display this data on a visual display.

Each pixel in an FPA may include a radiation detector that generates relatively small signals in response to detected radiation, such as in an infrared imaging array. These signals may be relatively small compared to signals or signal levels in the FPA arising from sources not caused by incident radiation, or non-image signals, wherein these non-image signals are related to the materials, structure, and/or components of the FPA. For example, pixels in an FPA can include interface circuitry including resistor networks, transistors, and capacitors on a readout integrated circuit (ROIC) that may be directly interfaced to the array of detectors. For instance, a microbolometer detector array, a microelectrical mechanical system (MEMS) device, may be manufactured using a MEMS process. The associated ROTC, however, may be fabricated using electronic circuit techniques. These two components can be combined together to form the FPA. The combination of the interface circuitry and the detector itself may have offset and temperature behaviors that are relatively large compared to the signals produced in response to incident radiation on the detectors. Thus, it may be desirable to compensate for these effects that are not related to the image signal before displaying or otherwise processing the image data.

Examples of image processing systems and methods are disclosed in U.S. patent application Ser. No. 14/829,500, now U.S. Pat. No. 9,584,750, filed Aug. 18, 2015, U.S. patent application Ser. No. 14/292,124, filed May 30, 2014, U.S. patent application Ser. No. 14/829,490, now U.S. Pat. No. 9,595,934, filed Aug. 18, 2015, U.S. patent application Ser. No. 14/817,989, filed Aug. 4, 2015, and U.S. patent application Ser. No. 817,847, filed Aug. 4, 2015, each of which is incorporated by reference herein in its entirety.

These referenced applications describe a variety of imaging system configurations and various techniques for adjusting for artifacts and correcting for degradations in image quality that arise at least in part due to various properties and characteristics of the imaging systems. These various image processing functions may be accomplished in a processing unit, which, as described, may either be part of a camera device, a processing device interfaced to the camera device, and/or distributed between the two. The processing unit may include, for some imaging systems, control functions for operating a shutter. A visible sensor, usually including a visible light sensitive FPA may also be used. Such visible imaging systems are common in digital cameras, Personal Electronic Devices (PED's) and the like. The resources used for image processing and display functions of the two sensors may be shared or separate as convenient for a particular system design. Systems including multiple imaging sensors of various or the same types may also benefit from the disclosed systems and methods.

Example Imaging Systems

FIG. 1A illustrates a functional block diagram of an example thermal imaging system 100 comprising an image sensor such as a focal plane array 102, a pre-processing module 104, a non-uniformity correction module 106, a filter module 108, a thermography module 110, a histogram equalization module 112, a display processing module 114, and a display 116. The focal plane array 102 can output a sequence of frames of intensity data (e.g., images, thermal images, etc.). Each frame can include an array of pixel values, each pixel value representing light intensity detected by a corresponding pixel on the focal plane array 102. The pixel values can be read out of the focal plane array 102 as a stream of serial digital data. In some embodiments, the pixel values are read out of the focal plane array 102 using read out electronics that process whole rows or whole columns of the focal plane array 102. In some embodiments, the read out electronics outputs the data as a stream of a few columns or rows at a time. For instance some FPAs utilize a technique known as an electronic rolling shutter which activates the photodetectors during image acquisition in discrete increments, or sub-frames, of the total frame and outputs the sub-frames as they are acquired accordingly. Thus subsequent image processing may be configured to act on a sub-frame basis, working through the entire frame one or more sub-frames at a time. The format of the stream of data can be configured to conform to a desired, standard, or pre-defined format. The stream of digital data can be displayed as a two-dimensional image, such as by the display 116.

In some embodiments, the focal plane array 102 can be an array of microbolometers integrated with a readout integrated circuit ("ROIC"). The array of microbolometers can be configured to generate electrical signals in response to a quantity of thermal radiation or a temperature. The ROIC can include buffers, integrators, analog-to-digital converters, timing components, and the like to read the electrical signals from the array of microbolometers and to output a digital signal (e.g., 14-bit serial data separated into image frames). Additional examples of systems and methods associated with the focal plane array 102 are disclosed in U.S. patent application Ser. No. 14/292,124, entitled "Data Digitization and Display for an Imaging System," filed May 30, 2014, the entire contents of which is incorporated by reference herein.

The focal plane array 102 can have calibration or other monitoring information associated with it (e.g. calibration data 103) that can be used during image processing to generate a superior image. For example, calibration data 103 may include bad pixel maps, and/or gain tables stored in data storage and retrieved by modules in the imaging system 100 to correct and/or adjust the pixel values provided by the focal plane array 102. Calibration data 103 may include one or more gain tables. As described herein, the focal plane array 102 can include a plurality of pixels with integrated readout electronics. The readout electronics can have a gain associated with it, wherein the gain may be, for example, proportional to the transimpedance of a capacitor in the electronics, or otherwise related to a characteristic of the electronics. This gain value, which may in some implementations take the form of a pixel gain table, may be used by the image processing modules of the imaging system 100. Additional examples of calibration data for the imaging system 100 are provided in U.S. patent application Ser. No. 14/829,490, entitled "Gain Calibration for an Imaging System," filed Aug. 18, 2015, the entire contents of which is incorporated by reference herein. The calibration data 103 can be stored on the imaging system 100 or in data storage on another system for retrieval during image processing.

The example imaging system 100 includes one or more modules configured to process image data from the focal plane array 102. One or more of the modules of the imaging system 100 can be eliminated without departing from the scope of the disclosed embodiments, and modules not shown may be present as well. The following modules are described to illustrate the breadth of functionality available to the disclosed imaging systems and not to indicate that any individual module or described functionality is required, critical, essential, or necessary. Modules such as non-uniformity correction module 106, the filter module 108, the thermography module 110, and/or the histogram equalization module 112 may be collectively described as an "image processing chain."

The example imaging system 100 includes the pre-processing module 104. The pre-processing module 104 can be configured to receive the digital data stream from the focal plane array 102 and to perform pre-processing functions. Examples of such functions include frame averaging, high-level frame-wide filtering, etc. The pre-processing module 104 can output serial digital data for other modules.

As an example, the pre-processing module 104 can include conditional summation functionality configured to implement integration and averaging techniques to increase apparent signal to noise in image data. For example, the conditional summation functionality can be configured to combine successive frames of digitized image data to form a digitally integrated image. This digitally integrated image can also be averaged to reduce noise in the image data. The conditional summation functionality can be configured to sum values from successive frames for each pixel from the focal plane array 102. For example, the conditional summation functionality can sum the values of each pixel from four successive frames and then average that value. In some implementations, the conditional summation functionality can be configured to select a best or preferred frame from successive frames rather than summing the successive frames. Examples of these techniques and additional embodiments are disclosed in U.S. patent application Ser. No. 14/292,124, entitled "Data Digitization and Display for an Imaging System," filed May 30, 2014, the entire contents of which is incorporated by reference herein.

As another example, the pre-processing module 104 can include adaptive resistor digital to analog converter ("RDAC") functionality configured to determine and/or adjust for operating bias points of the focal plane array 102. For example, for an imaging system that includes a shutter, the imaging system 100 can be configured to adjust an operating bias point of the detectors in the focal plane array 102. The adaptive RDAC functionality can implement an adaptive operating bias correction method that is based at least in part on periodic measurement of a flat field image (e.g., an image acquired with the shutter closed). The adaptive RDAC functionality can implement an ongoing adjustment of the operating bias based at least in part on a measured or detected drift over time of the flat field image. The bias adjustment provided by the adaptive RDAC functionality may provide compensation for drift over time of the photodetectors and electronics due to effects such as temperature changes. In some embodiments, the adaptive RDAC functionality includes an RDAC network that can be adjusted to bring measured flat field data closer to a reference bias level. Additional examples of systems and methods related to the adaptive RDAC functionality are provided in U.S. patent application Ser. No. 14/829,500, filed Aug. 18, 2015, entitled "Adaptive Adjustment of the Operating Bias of an Imaging System," the entire contents of which is incorporated by reference herein.

Bad pixel replacement may be present as well, examples of which are described in U.S. Prov. App'n No. 62/297,669, entitled "Pixel Decimation for an Imaging System," and filed Feb. 19, 2016, the entire contents of which is incorporated by reference herein. Bad pixel replacement functionality, which may include pixel decimation, may have access to a bad pixel map, which may be part of calibration data. In various implementations, bad pixels may be identified within image data by observing if given pixels are outside of pre-determined tolerances or vary from their neighbors by more than pre-determined thresholds.

After the pre-processing module 104, other processing modules can be configured to perform a series of pixel-by-pixel or pixel group processing steps. For example, the image processing system 100 includes a non-uniformity correction module 106 configured to adjust pixel data for gain and offset effects that are not part of the image scene itself, but are artifacts of the sensor. For example, the non-uniformity correction module 106 can be configured to receive a stream of digital data and correct pixel values for non-uniformities in the focal plane array 102. In some imaging systems, these corrections may be derived from actuation of an in-operation calibration element such as intermittently closing a shutter over the focal plane array 102 to acquire uniform scene data. From this acquired uniform scene data, the non-uniformity correction module 106 can be configured to determine deviations from uniformity. The non-uniformity correction module 106 can be configured to adjust pixel data based on these determined deviations. In some imaging systems, the non-uniformity correction module 106 utilizes other techniques to determine deviations from uniformity in the focal plane array. Some of these techniques can be implemented without the use of a shutter, and may use another type of in-operation element, and may rely on presenting known scenes to the imaging array as opposed to flat-field scenes. Some NUC techniques do not rely on physical calibration elements and use image processing techniques to derive a NUC. Additional examples of systems and methods for non-uniformity correction are described in U.S. patent application Ser. No. 14/817,847, entitled "Time Based Offset Correction for Imaging Systems," filed Aug. 4, 2015, the entire contents of which is incorporated by reference herein. Adaptive calibration or shutter control may include elements present in the pre-processing module 104 or equivalent, as well as parts of the image processing chain as described in in U.S. patent application Ser. No. 15/068,405, entitled "TIME BASED OFFSET CORRECTION FOR IMAGING SYSTEMS AND ADAPTIVE CALIBRATION," filed Mar. 11, 2016, the entire contents of which is incorporated by reference herein. FPN mitigation elements may if desired take place as part of the NUC module in order to place this functionality early in the image processing chain. FPN mitigation should preferably take place after offset correction so could not reasonably happen before NUC.

After the pre-processing module 104, the imaging system 100 can include a high/low $C_{int}$ signal processing functionality configured to receive a stream of digital data (e.g., 14-bit serial data) from the pre-processing module 104. The high/low $C_{int}$ functionality can be configured to process the stream of digital data by applying gain tables, for example, as provided in the calibration data 103. The high/low $C_{int}$ functionality can be configured to process the stream of digital data using output of high/low integration components. Such high/low integration components can be integrated with the ROIC associated with the focal plane array 102. Examples of the high/low integration components are described in U.S. patent application Ser. No. 14/292,124, entitled "Data Digitization and Display for an Imaging System," filed May 30, 2014, the entire contents of which is incorporated by reference herein.

The example image processing system 100 includes a filter module 108 configured to apply one or more temporal and/or spatial filters to address other image quality issues. For example, the readout integrated circuit of the focal plane array can introduce artifacts into an image, such as variations between rows and/or columns. The filter module 108 can be configured to correct for these row- or column-based artifacts, as described in greater detail in U.S. patent application Ser. No. 14/702,548, entitled "Compact Row Column Noise Filter for an Imaging System," filed May 1, 2015, the entire contents of which is incorporated by reference herein. The filter module 108 can be configured to perform corrections to reduce or eliminate effects of bad pixels in the image, enhance edges in the image data, suppress edges in the image data, adjust gradients, suppress peaks in the image data, and the like.

For example, the filter module 108 can include bad pixel functionality configured to provide a map of pixels on the focal plane array 102 that do not generate reliable data. These pixels may be ignored or discarded. In some embodiments, data from bad pixels is discarded and replaced with data derived from neighboring, adjacent, and/or near pixels. The derived data can be based on interpolation, smoothing, averaging, or the like. For the case where pixel decimation with bad pixel replacement is desired, the bad pixel functionality may be placed earlier in the chain.

As another example, the filter module 108 can include thermal gradient functionality configured to adjust pixel values based on thermal gradients present in the image data but that are not part of the scene imaged by the imaging system 100. The thermal gradient functionality can be configured to use local flat scene data to derive data to improve image quality by correcting for thermal gradients produced in the imaging system 100. Examples of determining corrections for the thermal gradient functionality are described in greater detail in U.S. patent application Ser. No. 14/956,111, entitled "Image Adjustment Based on Locally Flat Scenes," filed Dec. 1, 2015, the entire contents of which is incorporated by reference herein.

The filter module 108 can include peak limit functionality configured to adjust outlier pixel values. For example, the peak limit functionality can be configured to clamp outlier pixel values to a threshold value.

The filter module 108 can be configured to include an adaptive low-pass filter and/or a high-pass filter, and/or a bandpass filter. In some embodiments, the imaging system 100 applies either the adaptive low-pass filter or the high-pass filter, but not both. The adaptive low-pass filter can be configured to determine locations within the pixel data where it is likely that the pixels are not part of an edge-type image component. In these locations, the adaptive low-pass filter can be configured to replace specific pixel data, as opposed to wider image area data, with smoothed pixel data (e.g., replacing pixel values with the average or median of neighbor pixels). This can effectively reduce noise in such locations in the image. The high-pass filter can be configured to enhance edges by producing an edge enhancement factor that may be used to selectively boost or diminish pixel data for the purpose of edge enhancement. Additional examples of adaptive low-pass filters and high-pass filters are described in U.S. patent application Ser. No. 14/817,989, entitled "Local Contrast Adjustment for Digital Images," filed Aug. 4, 2015, the entire contents of which is incorporated by reference herein. High-pass filter results, of the type described above, or in any form suitable for image processing functionality, may be employed as all or part of the information used for adaptive shutter control, as described herein with reference to FIG. 9. Highpass filter and related techniques may be used to detect edge features in an image as well.

The filter module 108 can be configured to apply optional filters to the image data. For example, optional filters can include, without limitation, averaging filters, median filters, smoothing filters, and the like. The optional filters can be turned on or off to provide targeted or desired effects on the image data.

The example image processing system 100 includes a thermography module 110 configured to convert intensity to temperature. The light intensity can correspond to intensity of light from a scene and/or from objects in a field of view of the imaging system 100. The thermography module 110 can be configured to convert the measured light intensities to temperatures corresponding to the scene and/or objects in the field of view of the imaging system 100. The thermography module 110 can receive as input calibration data (e.g., calibration data 103). The thermography module 110 may also use as inputs raw image data (e.g., pixel data from the pre-processing module 104) and/or filtered data (e.g., pixel data from the filter module 108). Examples of thermography modules and methods are provided in U.S. patent application Ser. No. 14/838,000, entitled "Thermography for a Thermal Imaging Camera," filed Aug. 27, 2015, the entire contents of which is incorporated by reference herein.

The example image processing system 100 includes a histogram equalization module 112, or other display conversion module (compression modules for example, or combinations of different techniques), configured to prepare the image data for display on the display 116. In some imaging systems, the digital resolution of the pixel values from the focal plane array 102 can exceed the digital resolution of the display 116. The histogram equalization module 112 can be configured to adjust pixel values to match the high resolution value of an image or a portion of an image to the lower resolution of the display 116. The histogram module 112 can be configured to adjust pixel values of the image in a manner that avoids using the limited display range of the display 116 on scene intensity values where there is little or no data. This may be advantageous for a user of the imaging system 100 when viewing images acquired with the imaging system 100 on the display 116 because it can reduce the amount of display range that is not utilized. For example, the display 116 may have a digital brightness scale, which for an infrared image corresponds to temperature where higher intensity indicates a higher temperature. However, the display brightness scale, for example a grey scale, is generally a much shorter digital word than the pixel sample words, which is related to analog to digital (A/D) conversion resolution. For instance, the A/D sample word of the pixel data may be 14 bits while a display range, such as grey scale, can be typically 8 bits. So for display purposes, the histogram equalization module 112 can be configured to compress the higher resolution image data to fit the display range of the display 116. Examples of algorithms and methods that may be implemented by the histogram equalization module 112 are disclosed in U.S. patent application Ser. No. 14/292,124, entitled "Data Digitization and Display for an Imaging System," filed May 30, 2014, the entire contents of which is incorporated by reference herein.

The example imaging system 100 includes a display processing module 114 configured to prepare the pixel data for display on the display 116 by, for example, selecting color tables to convert temperatures and/or pixel values to color on a color display. As an example, the display processing module can include a colorizer lookup table configured to convert pixel data and/or temperature data into color images for display on the display 116. The colorizer lookup table can be configured to display different temperatures of a thermally imaged scene using different color display lookup tables depending at least in part on the relationship of a temperature of a given scene to a threshold temperature. For example, when a thermal image of a scene is displayed, various temperatures of the scene may be displayed using different lookup tables depending on their relationship to the input temperature. In some embodiments, temperatures above, below, or equal to an input temperature value may be displayed using a color lookup table, while other temperatures may be displayed using a grey scale lookup table. Accordingly, the colorizer lookup table can be configured to apply different colorizing lookup tables depending on temperature ranges within a scene in combination with user preferences or selections. Additional examples of functionality provided by a display processing module are described in U.S. patent application Ser. No. 14/851,576, entitled "Selective Color Display of a Thermal Image," filed Sep. 11, 2015, the entire contents of which is incorporated by reference herein. The Display Processing Module 114 may also contain or interface to a display driver which converts color table values to actual luminance color values to drive the display 116, such as RGB, yCV etc.

The display 116 can be configured to display the processed image data. The display 116 can also be configured to accept input to interact with the image data and/or to control the imaging system 100. For example, the display 116 can be a touchscreen display.

The imaging system 100 can be provided as a standalone device, such as a thermal sensor. For example, the imaging system 100 can include an imaging system housing configured to enclose hardware components (e.g., the focal plane array 102, read out electronics, microprocessors, data storage, field programmable gate arrays and other electronic components, and the like) of the imaging system 100. The imaging system housing can be configured to support optics configured to direct light (e.g., infrared light, visible light, etc.) onto the image sensor 102. The housing can include one or more connectors to provide data connections from the imaging system 100 to one or more external systems. The housing can include one or more user interface components to allow the user to interact with and/or control the imaging system 100. The user interface components can include, for example and without limitation, touch screens, buttons, toggles, switches, keyboards, and the like.

In some embodiments, the imaging system 100 can be part of a network of a plurality of imaging systems. In such embodiments, the imaging systems can be networked together to one or more controllers.

Figure 1B:
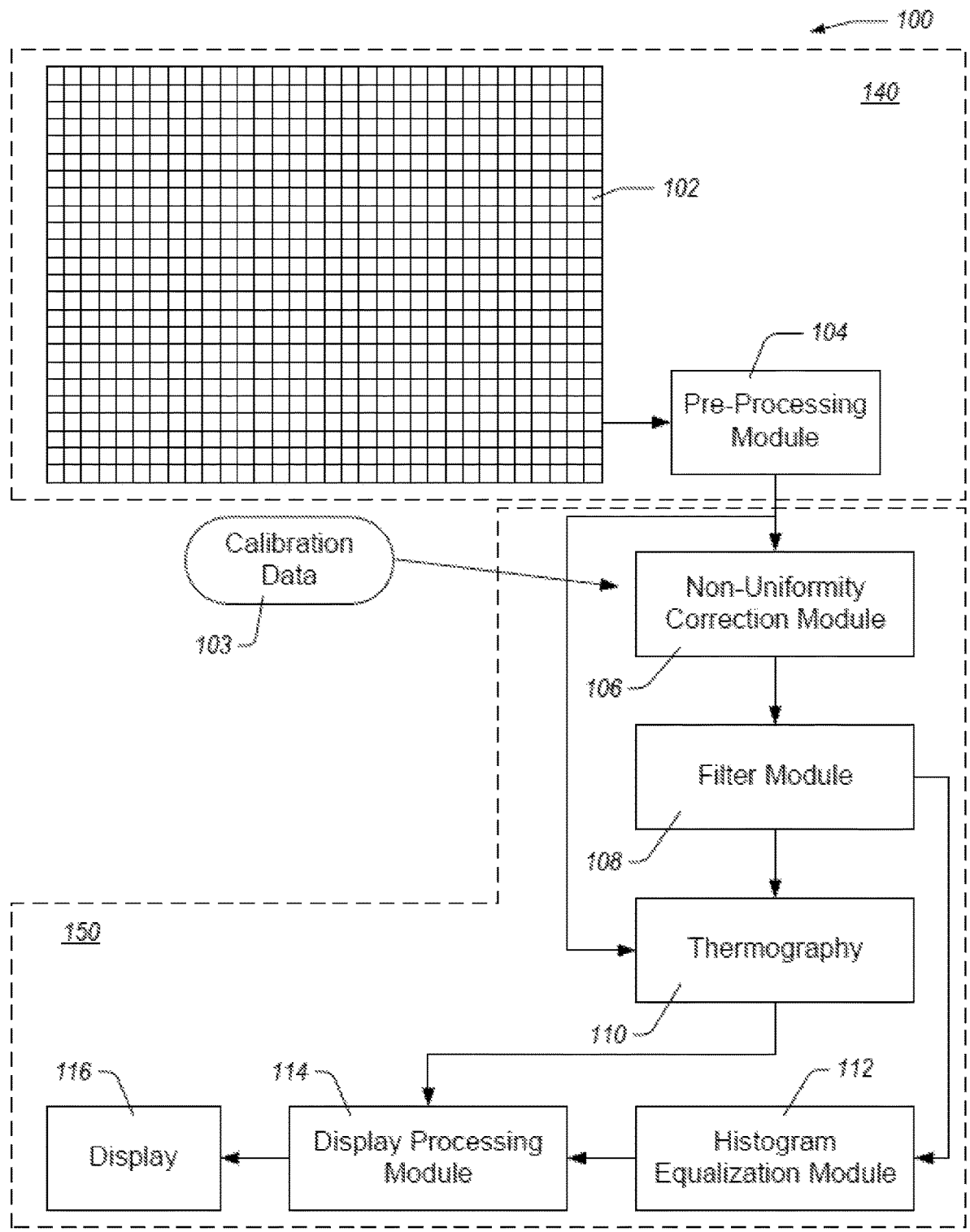
FIG. 1B illustrates a functional block diagram of the example imaging system illustrated in FIG. 1A, wherein functionality of the imaging system is divided between a camera and a mobile electronic device.

FIG. 1B illustrates a functional block diagram of the example imaging system 100 illustrated in FIG. 1A, wherein functionality of the imaging system 100 is divided between a camera or sensor 140 and a processing device 150. Processing device 150 may be a mobile device or other computing device. By dividing image acquisition, pre-processing, signal processing, and display functions among different systems or devices, the camera 140 can be configured to be relatively low-power, relatively compact, and relatively computationally efficient compared to an imaging system that performs a majority or all of such functions on board. As illustrated in FIG. 1B, the camera 140 is configured to include the focal plane array 102 and the pre-processing module 104. In some embodiments, one or more of the modules illustrated as being part of the processing device 150 can be included in the camera 140 instead of in the processing device 150. In some embodiments, certain advantages are realized based at least in part on the division of functions between the camera 140 and the processing device 150. For example, some pre-processing functions can be implemented efficiently on the camera 140 using a combination of specialized hardware (e.g., field-programmable gate arrays, application-specific integrated circuits, etc.) and software that may otherwise be more computationally expensive or labor intensive to implement on the processing device 150. Accordingly, an aspect of at least some of the embodiments disclosed herein includes the realization that certain advantages may be achieved by selecting which functions are to be performed on the camera 140 (e.g., in the pre-processing module 104) and which functions are to be performed on the processing device 150 (e.g., in the thermography module 110).

An output of the camera 140 can be a stream of digital data representing pixel values provided by the pre-processing module 104. The data can be transmitted to the processing device 150 using electronic connectors (e.g., a micro-USB connector, proprietary connector, etc.), cables (e.g., USB cables, Ethernet cables, coaxial cables, etc.), and/or wirelessly (e.g., using BLUETOOTH, Near-Field Communication, Wi-Fi, etc.). The processing device 150 can be a smartphone, tablet, laptop, computer or other similar portable or non-portable electronic device. In some embodiments, power is delivered to the camera 140 from the processing device 150 through the electrical connectors and/or cables.

The imaging system 100 can be configured to leverage the computing power, data storage, and/or battery power of the processing device 150 to provide image processing capabilities, power, image storage, and the like for the camera 140. By off-loading these functions from the camera 140 to the processing device 150, the camera can have a cost-effective design. For example, the camera 140 can be configured to consume relatively little electronic power (e.g., reducing costs associated with providing power), relatively little computational power (e.g., reducing costs associated with providing powerful processors), and/or relatively little data storage (e.g., reducing costs associated with providing digital storage on the camera 140). This can reduce costs associated with manufacturing the camera 140 due at least in part to the camera 140 being configured to provide relatively little computational power, data storage, and/or power, because the imaging system 100 leverages the superior capabilities of the processing device 150 to perform image processing, data storage, and the like.

Concepts of FPN Mitigation or Reduction

The present disclosure relates primarily to imaging systems susceptible to Fixed Pattern Noise (FPN), as may be the case for any kind of imaging system but is often the case for thermal imaging systems and especially lower cost thermal imaging sensors. Fixed Pattern Noise is the term generally used to describe image degradation due to pixel to pixel noise level variation or response variation to the same signal. One aspect of FPN may be pixel to pixel offset variations, which may be addressed with an offset or uniformity correction operation. In some embodiments, the present disclosure is useful in imaging systems that perform a Non-Uniformity Correction (NUC) operation that is distinct from an FPN mitigation. For example, the NUC may be performed using a calibration device such as a shutter, closing the shutter on occasion thereby exposing the imaging sensor, such as an IR FPA, to a flat-field scene and determining pixel to pixel offsets from variations in pixel response to the flat-field scene. By closing the shutter occasionally over time during imaging operation both offset and offset drift, such as due to temperature change of the system, may be addressed. Other physical calibration techniques than a shutter are possible as well. Scene based offset or NUC techniques, with no shutter or other physical calibration element, are also possible and some of these also address FPN, however such systems which do not use physical periodic offset calibration, may not perform as well. Moreover, exposure to a known temperature uniform scene at times during imaging operation, which can be accomplished by closing a shutter, is helpful in maintaining thermographic accuracy over time for thermal imaging systems. Thus the present disclosure relates to FPN mitigation, which may be present in addition to offset correction based on physical calibration, although the teachings of the present disclosure may be used independent of other offset corrections as well.

Figure 2:
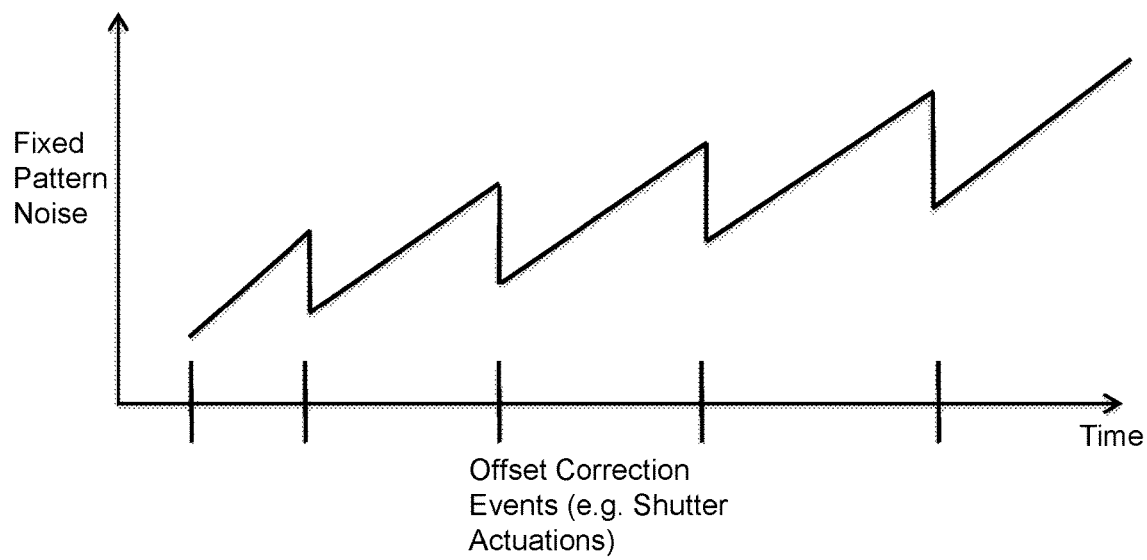
FIG. 2 illustrates how FPN behaves over time in some imaging systems.

For systems with a shutter, a common operational calibrator for thermal imaging systems, the placement of the shutter relative to the sensor (FPA) system optics, and system mechanical structure may often mean, with the shutter closed, the sensor may in fact be occluded from other sources of pixel to pixel offset such as temperature variations in the physical and/or optical elements of the system within the FOV of the sensor. Also, external scene elements may be focused onto the sensor at differing angles through the optics compared to the observing the closed shutter, which may cause additional pixel to pixel offsets if the individual sensors have angular dependent responsivity differences. Or, unlike the flat-field temperature of the shutter, scene features may have varying temperatures and the pixels may have differing temperature dependent responsivities and/or signal to noise characteristics. Whatever the cause, FPN can occur in systems even with physical offset calibration. FIG. 2 illustrates observed FPN behavior for an example shutter-based thermal imager. As can be seen in FIG. 2, FPN is reduced with each shutter closure and subsequent offset correction, but in between shutter closures FPN will build back up, and sometimes the baseline FPN will grow over the course of time despite shutter closure offset corrections.

Figure 3:
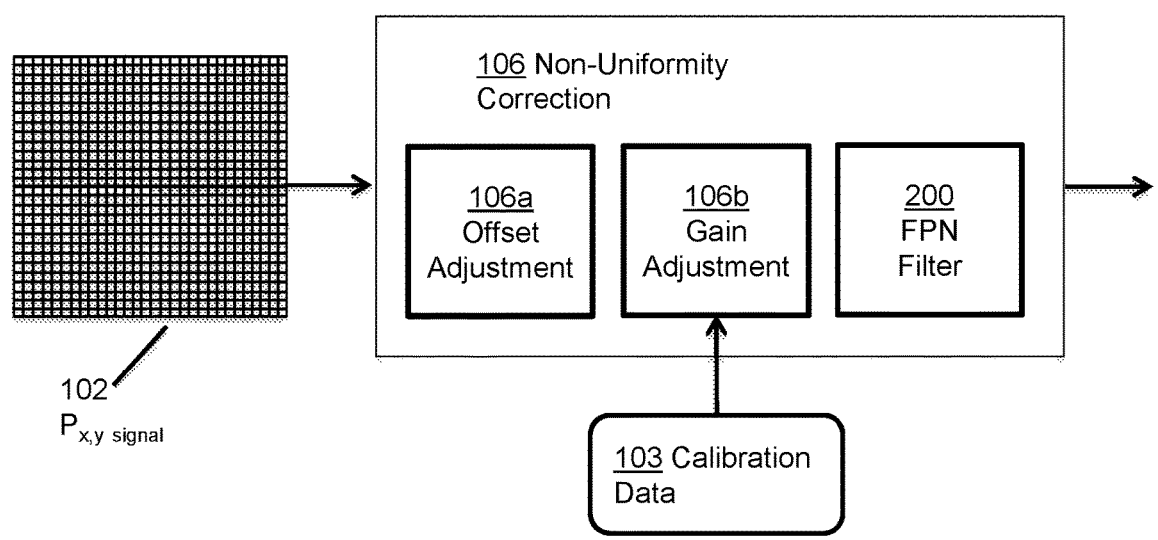
FIG. 3 illustrates example Non-Uniformity Correction (NUC) steps for an imaging system.
Figure 4:
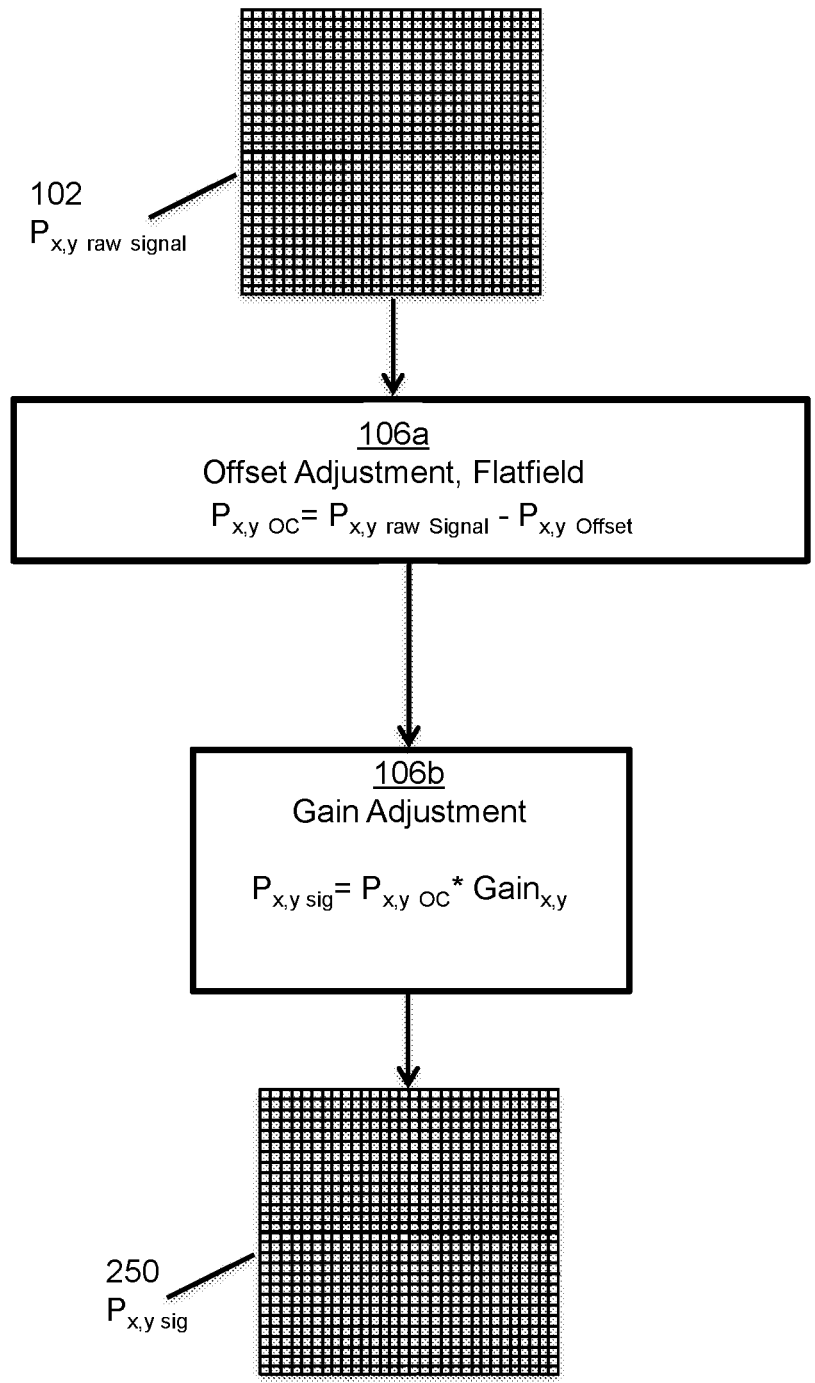
FIG. 4 illustrates example operation of offset and gain NUC elements.
Figure 5:
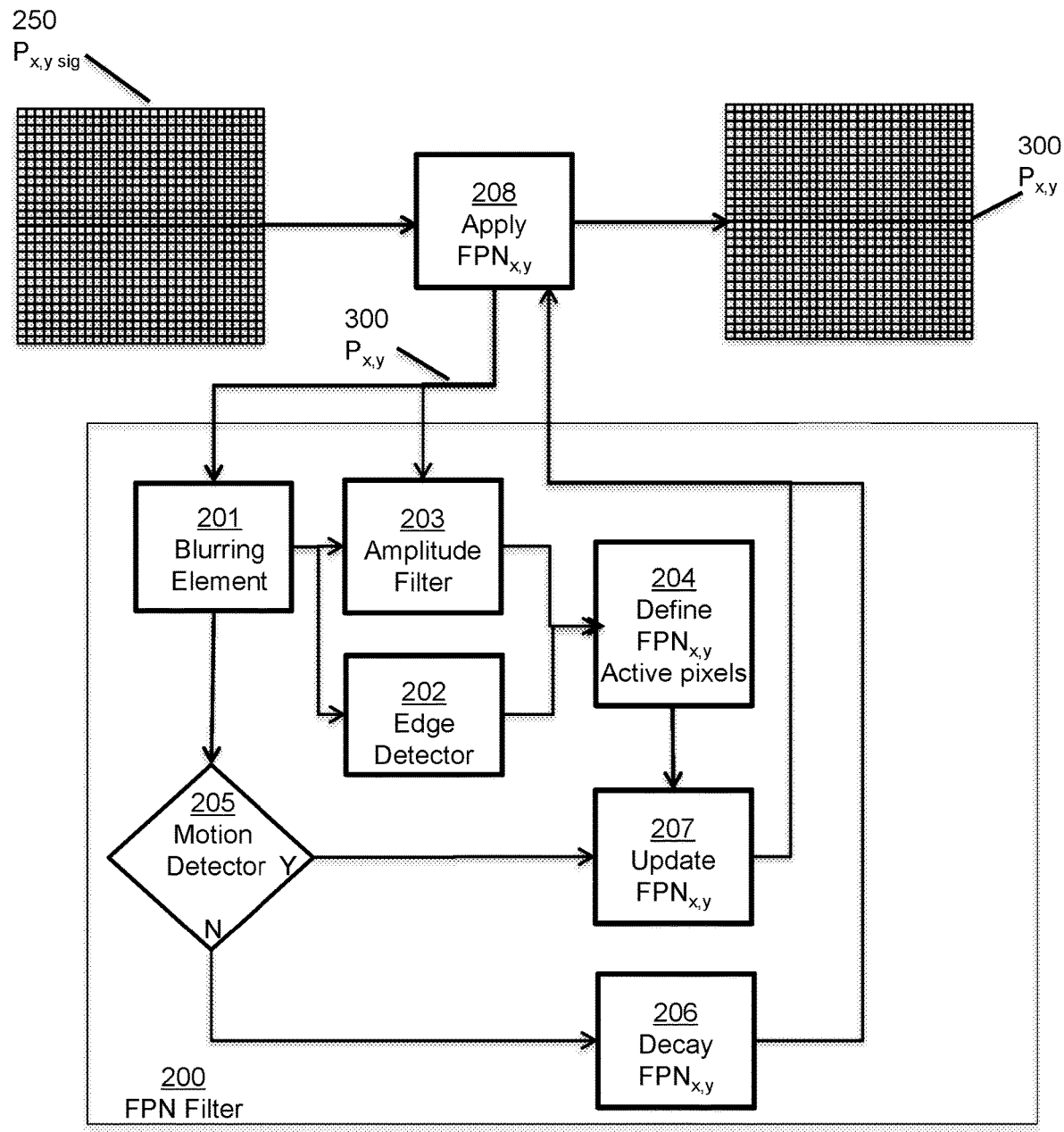
FIG. 5 is a block diagram of an example embodiment of an FPN reduction element.

Thus a system may generate clean images initially but image quality may degrade over time even with periodic shutter based offset calibration FIG. 3 illustrates an example arrangement where an FPN Filter 200 is part of the NUC module 106. The FPN filter will be applied to image data that has been adjusted for offset 106a and gain variations 106b, or in other words may be considered for this example arrangement as part of the NUC process. Of course the FPN filter could be placed in other parts of the image processing chain, but applying it early may in fact reduce or eliminate the need for other parts of the image processing chain. This may speed up the processing of image frames and/or increase the fidelity of the data as each image processing step may tend to flatten or distort image data to some extent. FIG. 4 illustrates how a set of pixels, $P_{x,y\ raw\ signal}$ is processed in a shutter based system with offset drift control, e.g. RDAC adjustment. First flat-field image frames derived from shutter closed imaging, with RDAC adjustment, is used to correct for pixel to pixel offsets, and then the gain table is applied on a per pixel basis, creating the pixel set $P_{x,y\ sig}$ which is in turn delivered to the FPN Filter. In some cases it may be desirable to exclude from the $P_{x,y\ sig}$ data set pixels adjacent or even a few pixels in, from the image frame boundaries. In that case, no FPN correction is applied to the boundary pixels Example FPN Mitigation System Elements FIG. 5 depicts elements of an exemplary FPN filter 200, which receives image data in the form of pixel set $P_{x,y\ sig}$ and passes on reduced FPN pixel set $P_{x,y}$. The filter may act in a feed forward fashion, in that the FPN filter correction $FPN_{x,y}$ from the previous frame is applied to $P_{x,y\ sig}$ to create FPN corrected pixel set $P_{x,y}$. Thus FPN filter 200 acts on already filtered data, $P_{x,y}$, and blurred (201), data set $K_{x,y}$. $K_{x,y}$ is saved such that the blurred data set from the current image frame and at least the previous frame is available to Filter 200. It may be advantageous to apply the FPN filter more strongly to some parts of the image than to others. Image areas of high contrast such as edges or high amplitude areas will not blur into a quasi flat-field state and therefore may not be as useful in generating FPN corrections. Thus an edge detector 202 and an amplitude detector 203 may be used to identify certain areas of the image, and a Define FPN active pixels element 204 may be employed to designate which pixels will be used by the FPN filter and which pixels will be excluded from determining FPN mitigation.

Using blurred data from the current and at least one previous frame, motion detector 205 detects if there is frame to frame image motion. If there is motion, Update element 207 updates the FPN correction data set $FPN_{x,y}$ and the updating may take a different form for excluded pixels and non-excluded pixels. If motion is not detected, it may be desirable to decay $FPN_{x,y}$ as the image is static and the $FPN_{x,y}$ data set becomes less valid over time, and therefore should not continue to contribute to the filter. The correction data $FPN_{x,y}$ from the previous frame is applied to $P_{x,y\ sig}$ to create FPN corrected data $P_{x,y}$ which is passed on to the rest of the image processing chain and to the current frame's FPN filter operations. Thus the FPN correction term from the previous frame is fed forward to the current frame, and is used to both FPN correct the image for further processing and to use FPN corrected data to calculate the current FPN correction term, which will in turn be fed forward to the next frame.

Now we turn to a description of example implementations of each element in the FPN filter. Although a specific implementation will be described for each element, it is understood that many of these elements represent functions often used in image processing. Many image processing operations, such as filters, smoothing, clipping, and the like are based on, for a given pixel, replacing or modifying the pixel based on a calculation of some type involving a rectangular or square grouping of surrounding pixels. This grouping is called a kernel and most commonly the kernel is rolled through the active part of an image, i.e. the area of the image to be processed, such that each active pixel experiences an operation involving the kernel of which it is the center. The disclosed implementations are, for the most part, kernel based image processing functions, and many variations, as well as kernel sizes, are possible for several of these elements. For instance, there are many ways to perform a blurring operation, including replacing the center pixel with some value derived from the surrounding pixels, e.g. mean median or the like, or reducing the value of the center pixel by an amount and spreading that amount to the surrounding pixels. Edge detection can be performed in a variety of ways, including several types of high pass filter operations. Clipping or peak detection may also be performed in a variety of ways, and image motion detection also has many possible implementations. Most descriptions of Scene Based NUC techniques will contain a version of image motion detection. Thus the current disclosure and broad claims directed to its teachings should not be considered limited by the specific FPN filter element descriptions, as these descriptions are meant to teach one approach to realizing an FPN filter based on those elements.

Figure 6:
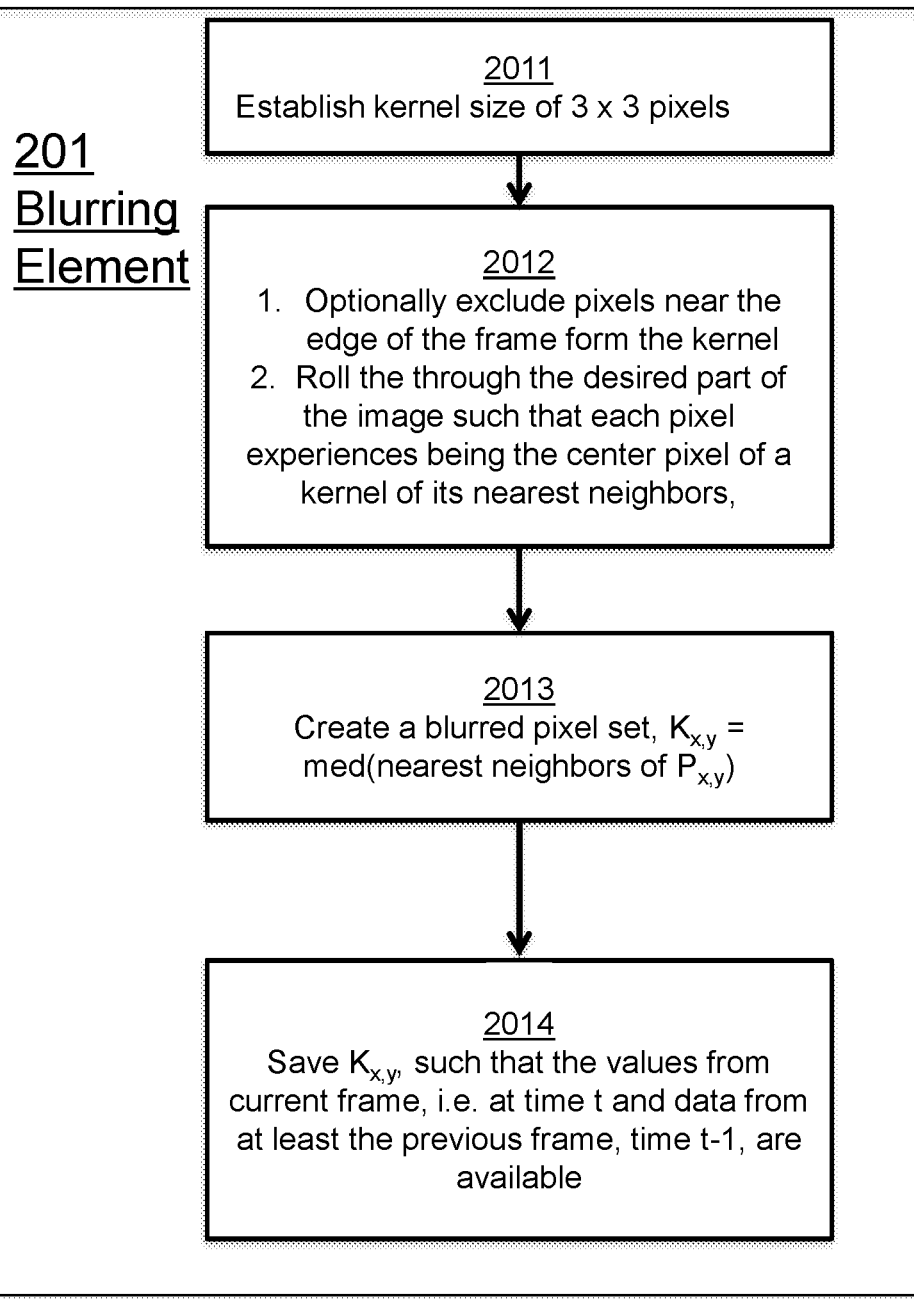
FIG. 6 illustrates an example blurring element.

FIG. 6 shows an example blurring element 201. Operation 2011 establishes a kernel size of 3×3. Operation 2011 may be a nearest-neighbors kernel including a central pixel and its nearest neighbors. Operation 2012 rolls the kernel through the desired portion of the image, which optionally may be established to exclude pixels at or near the image boundaries. Operation 2013 creates a blurred pixel set $K_{x,y}$ by replacing each pixel with the median value of its nearest neighbors. Other functions besides median, such as mean, scaled mean/median, as well as other functions are possible. In step 2014 the $K_{x,y}$ blurred pixel set is saved for use by the filter for the next frame, so that at least two blurred pixel sets, from the current frame at time t and the previous frame time t−1 are available.

Figure 7:
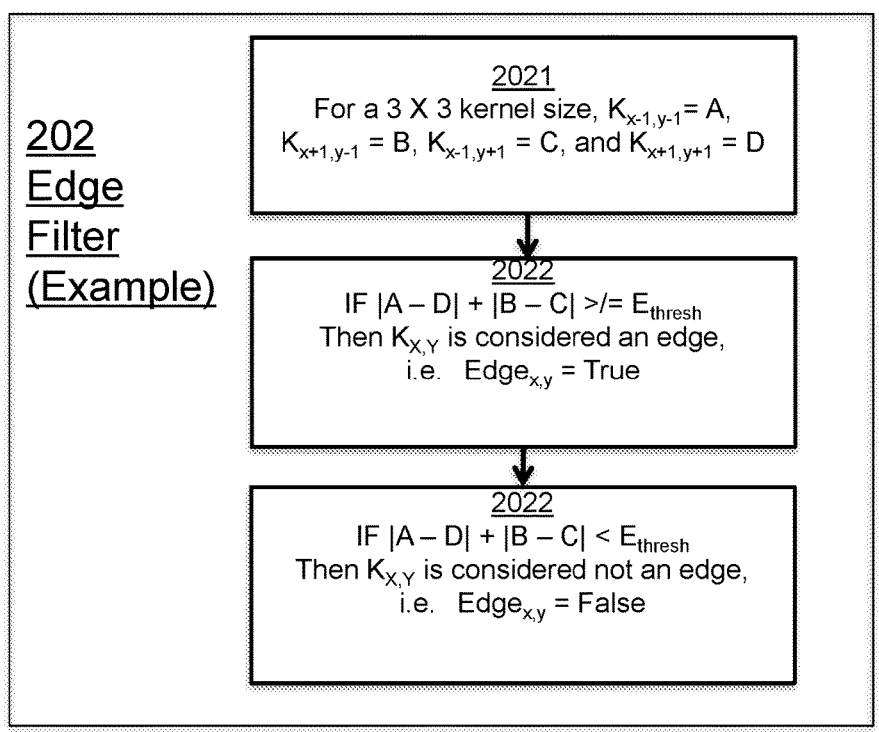
FIG. 7 illustrates an example edge filter.

FIG. 7 illustrates an edge detection element 202 for labeling a pixel as being an edge. For example, the edge detection element 202 can be configured to determine if an expression $Edge_{x,y}$ is true or false. The edge filter detection element 202 illustrates an X-filter edge detection scheme. However, it will be appreciated that any of various high-pass filter implementations may be used to identify edge pixels. FIG. 7 shows the edge detection element 202 applied to the blurred pixel set $K_{x,y}$, although the edge detection element 202 may equally be applied to the non-blurred pixel set $P_{x,y}$. Example edge threshold values for the illustrative edge of filter of FIG. 7 may be, for example, in the range of 10 to 200, 50 to 70 or other threshold value range.

Figure 8:
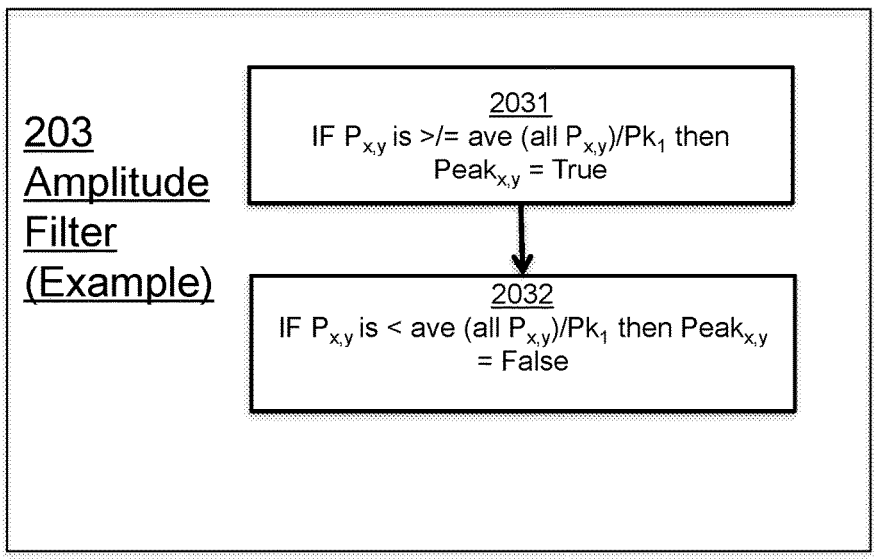
FIG. 8 illustrates an example amplitude filter.

FIG. 8 shows an example amplitude detector element 203. The amplitude detector element 203 uses both blurred and unblurred pixel data to identify a pixel as a peak. For example, an expression the amplitude detector element 203 can be configured to determine if an expression $Peak_{x,y}$ is true or false. Again, many variations on amplitude-based pixel identification and definition of a peak are possible. For the example implementation of FIG. 8, selecting an amplitude filter that identifies pixels whose value is greater than 20 percent of the average of all blurred (or un-blurred may be used as well) pixels has been used. In various embodiments, an amplitude filter may identify pixels whose value is greater than 10 percent, 20 percent, 30 percent, or other percentage of an average pixel value.

FIG. 9 shows an example active pixel identifier element 204. In some aspects, if the results from either the amplitude detector 203 or edge detector 202 are true for a given pixel, that pixel's associated FPN correction term, $FPN_{x,y}$, may remain the same and not be updated. For example, it remains the same value as it was the on the previous frame, $FPN_{x,y}(t-1)$. If the results of both detectors are false, the FPN correction term may be updated, as described below with reference to FIG. 12, to the current value $FPN_{x,y}(t)$. This exclusion process and the associated filters may improve the performance of the FPN filter, although an FPN filter may also be configured to update the correction term the same for all pixels. Generally, edges may not blur as well and therefore may not be useful for FPN mitigation. For a thermal imaging system, high-temperature regions, corresponding to higher amplitude regions, may not be as useful because the corrections may be dominated by gain error rather than offset error, while FPN correction is generally applicable to remove offsets.

Shown in FIG. 10 is an example implementation of a motion detector 205. This element uses both current frame blurred pixel data, $K_{x,y}(t)$ and blurred data from at least the previous frame $K_{x,y}(t-1)$. Two comparisons may be performed. The differences between blurred pixels from the current frame and the previous frame may be compared to a first predetermined threshold. In addition, the total number of differences that exceed the first threshold may be compared to a second predetermined count threshold. If the exceeding count is larger than the count threshold, motion between the two frames may be assumed. For example, an expression Motion may be determined to be true. The motion detector 205 depicted in FIG. 10 is a relatively simple, effective, and easy to implement embodiment of the motion detector 205. However, other image motion detection implementations may also be employed. Motion detection may be useful in many imaging systems, for example, particularly low cost thermal imaging systems, because image motion due to moving the imaging system may tend to temporarily blur the image. When the blurring step is applied to image data under motion, the blurring effect on low contrast areas of the image (which is why edges and hotspots may be excluded) can be accentuated to create quasi flat-field areas that relate to FPN. The quasi flat-field values act as a further related offset that can mitigate FPN. Example values for the difference threshold can be, for example, between 0 and 50. For example, the threshold may be 14 or another suitable number. In further example embodiments, the number threshold may be 0.1*N, where N is the number of non-excluded pixels from an active pixel identifier element such as the element 204 shown in FIG. 9. Values less than 1 as the multiplier of the non-excluded pixels may be appropriate.

Figure 11:
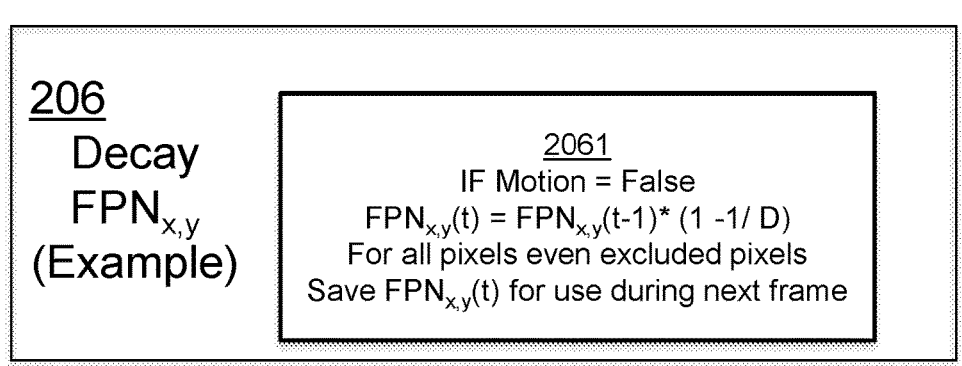
FIG. 11 illustrates an example Decay FPN element.
Figure 12:
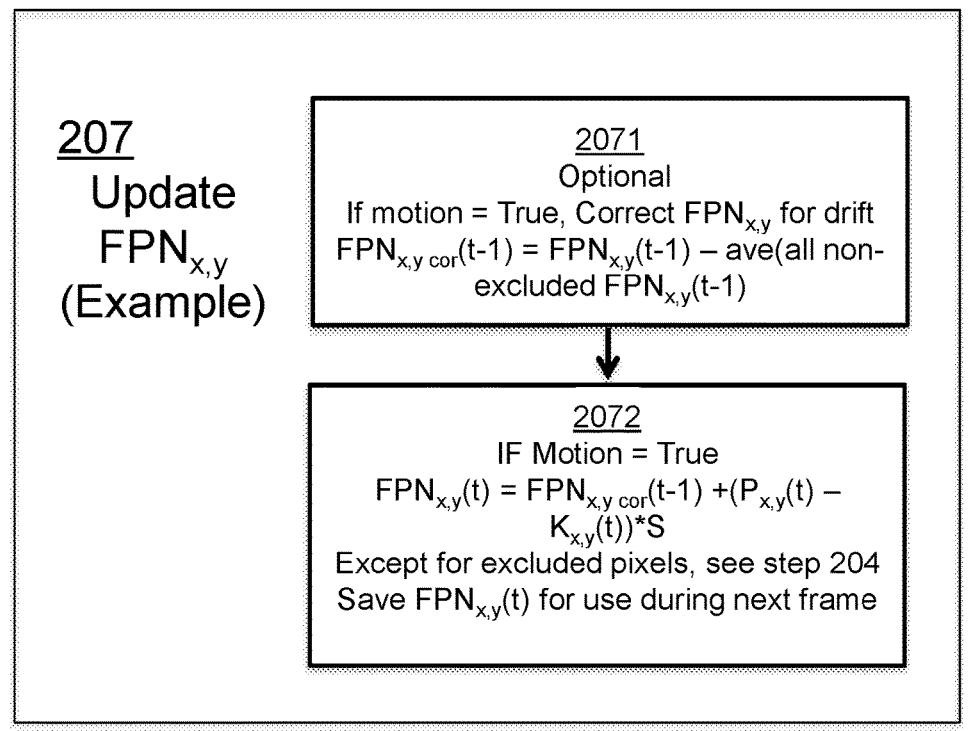
FIG. 12 illustrates an example update FPN element.

Referring now to FIGS. 11 and 12, an exemplary decay element 206 and an exemplary update FPN element 207 will be described. Depending on whether or not motion is detected, different scenarios are possible as shown in example decay element 206 and example update FPN element 207. If motion is true, than the correction factors for non-excluded pixels, $FPN_{x,y}(t)$ may be updated by adding a factor depending on current frame blurred and non-blurred pixel data, $P_{x,y}(t)$ and $K_{x,y}(t)$, to the previous correction term, $FPN_{x,y}(t-1)$. A scaling factor S (as shown in FIG. 7) has been used that is less than 1, and specifically 0.8 has been used. It may also be desirable to perform an optional offset correction for $FPN_{x,y}$. An example offset correction is shown in step 2071 of FIG. 7, where the mean of all FPN terms from non-excluded pixels is subtracted from the FPN term. For excluded pixels as shown in FIG. 9, the current correction factor is set equal to the value derived from the previous frame. For the first frame for which the FPN filter is applied, e.g., $t_0$, $FPN_{x,y}(t_0)$ is set to zero. When motion is not detected, the correction factor $FPN_{x,y}$ for both excluded and non-excluded pixels is decayed, as shown in example decay element 206 by multiplying the correction terms by a number less than 1. The number has been chosen to only be slightly less than 1 in some implementations, where a factor D of 1/16383 has been used for slow decay, but faster decay may be desirable in some circumstances as well.

Figure 13:
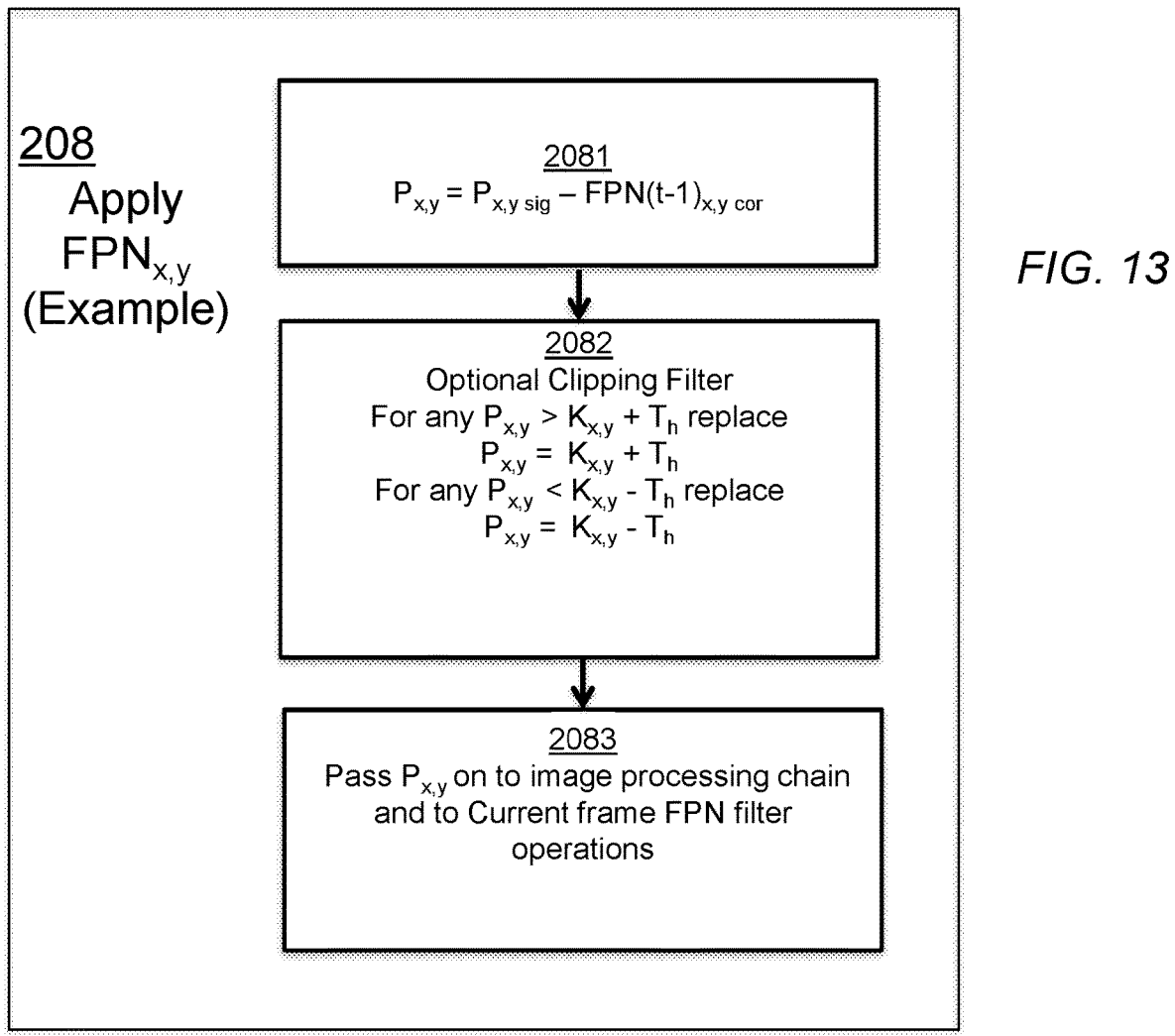
FIG. 13 illustrates an example apply FPN element.

Referring now to FIG. 13, an example apply FPN element 208 will be described. Once the correction term data set $FPN_{x,y}$ has been determined for each pixel, it may be applied to $P_{x,y\_sig}$ as shown in example apply element 208. In the example embodiment of FIG. 13, applying the correction may include subtraction of the correction term from the corresponding pixel signal value in operation 2081. As described above, the application is of the previous frame's derived FPN correction values, ie $FPN_{x,y}(t-1)$ such that the filter 200 acts on previously filtered pixel sets. Another optional operation 2082 is a clipping step to damp any particularly high-amplitude results. The clipping threshold $T_h$ may be between 0 and 1000 for this example implementation, for example, 200 or another number in the range. $P_{x,y}$ in step 2083 is passed onto the signal processing chain and to the current frame FPN filter operations.

It is understood that any of the "less than" or "greater than" symbols/wording shown in the FIGs and/or description could include or not include "or equal". It is also understood that variations on combining the element embodiments are possible, as not all elements may be required to achieve acceptable results in any given system. For example, the decay or exclusion operations may be optional for some systems. The numerical values given for the various thresholds and scaling factors are representative of a particular imaging system design and may not be optimal for a different system, which may apply different thresholds and/or scaling factors. The FPN filter may also be applied to the image datasets acquired when the shutter is closed, for example, the FPN filter could optionally run through the other NUC operations.

Example Method for FPN Mitigation

Figure 14:
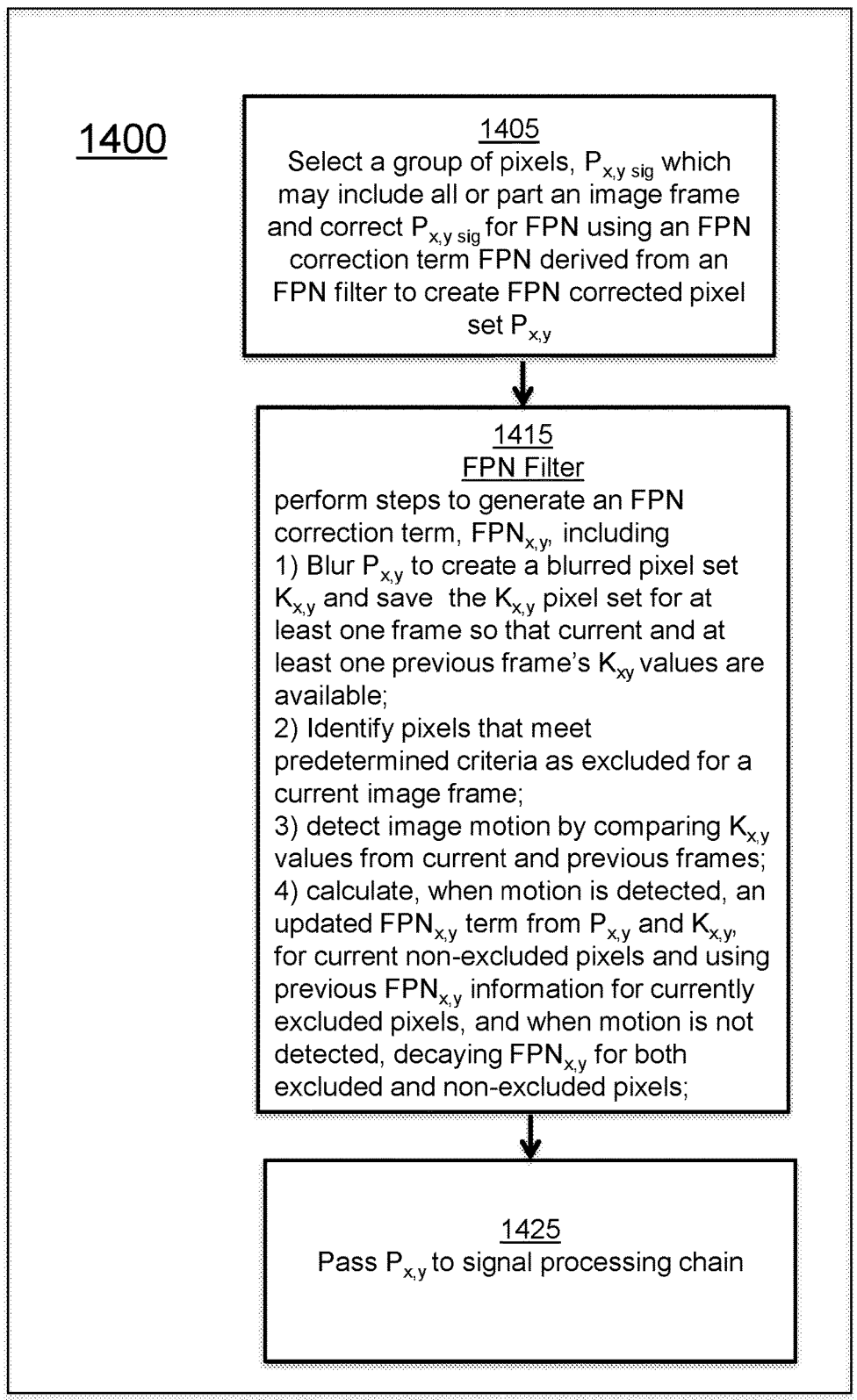
FIG. 14 illustrates a flow chart of an example method for reducing FPN.

FIG. 14 illustrates a flow chart of an example method 1400 for mitigating Fixed Pattern Noise. The method 1400 can be implemented using one or more hardware components in an imaging system or image processing system. For ease of description, the method 1400 will be described as being performed by the imaging system 100 described herein with reference to FIGS. 1A and 1B as well as FIGS. 4 and 5. However, one or more of the steps of the method 1400 can be performed by any module or combination of modules in the imaging system 100. Similarly, any individual step can be performed by a combination of modules not shown in the imaging system 100.

In block 1405, a group of pixels, $P_{x,y\_sig}$ is selected. The group of pixels $P_{x,y\_sig}$ may include all or part an image frame. $P_{x,y\_sig}$ is corrected for FPN using an FPN correction term FPN derived from an FPN filter. For example, it may be advantageous to exclude pixels at or near the image boundaries from the FPN operations.

In block 1415, the FPN filter is applied such that the FPN correction term is determined for each selected pixel in the frame. The determination includes performing steps to generate an FPN correction term, $FPN_{x,y}$, including 1) blurring $P_{x,y}$ to create a blurred pixel set $K_{x,y}$ and saving the $K_{x,y}$ pixel set for at least one frame so that $K_{x,y}$ values are available for the current frame and at least one previous frame;

2) identifying pixels that meet predetermined criteria as excluded for a current image frame;

3) detecting image motion by comparing $K_{x,y}$ values from current and previous frames;

4) calculating, when motion is detected, an updated $FPN_{x,y}$ term from $P_{x,y}$ and $K_{x,y}$, for current non-excluded pixels and using previous $FPN_{x,y}$ information for currently excluded pixels, and when motion is not detected, decaying $FPN_{x,y}$ for both excluded and non-excluded pixels.

Optional implementations of the elements to perform these steps are possible as explained above in the detailed element descriptions.

In block 1425, the corrected image frame is passed on to the signal processing chain. For example, the corrected image frame may be passed on to a display such as the display 116 shown in FIGS. 1A and 1B, and/or any other intervening components of the system 100.

Certain elements of the FPN filter may also be applicable for other noise sources, even if the noise is not Fixed Pattern Noise. For instance the readout electronics for many FPA's often is organized in such a way that elements of the photodetector circuits, other than the detector itself, e.g. current and voltage setting resistors, integration capacitors, gain amplifiers etc. are usually not present for each photodetector. Rather, some of these circuit elements are present in numbers smaller than the total number of photodetectors, and are switched to individual detectors as that particular detector's signal is accessed and read out. Often the circuit elements are arranged such that they are switched in as either a particular row, particular column, or some combination of rows and columns of detectors. Due to switching, settling time, and other artifacts, noise contributions that are associated with entire rows and/or columns may exist, and these noise contributions may vary in time from frame to frame, so they won't necessarily be reduced by an FPN filter. In addition to time variance, offsets between these pixel groupings may also be a significant fixed spatial component.

Figure 15:
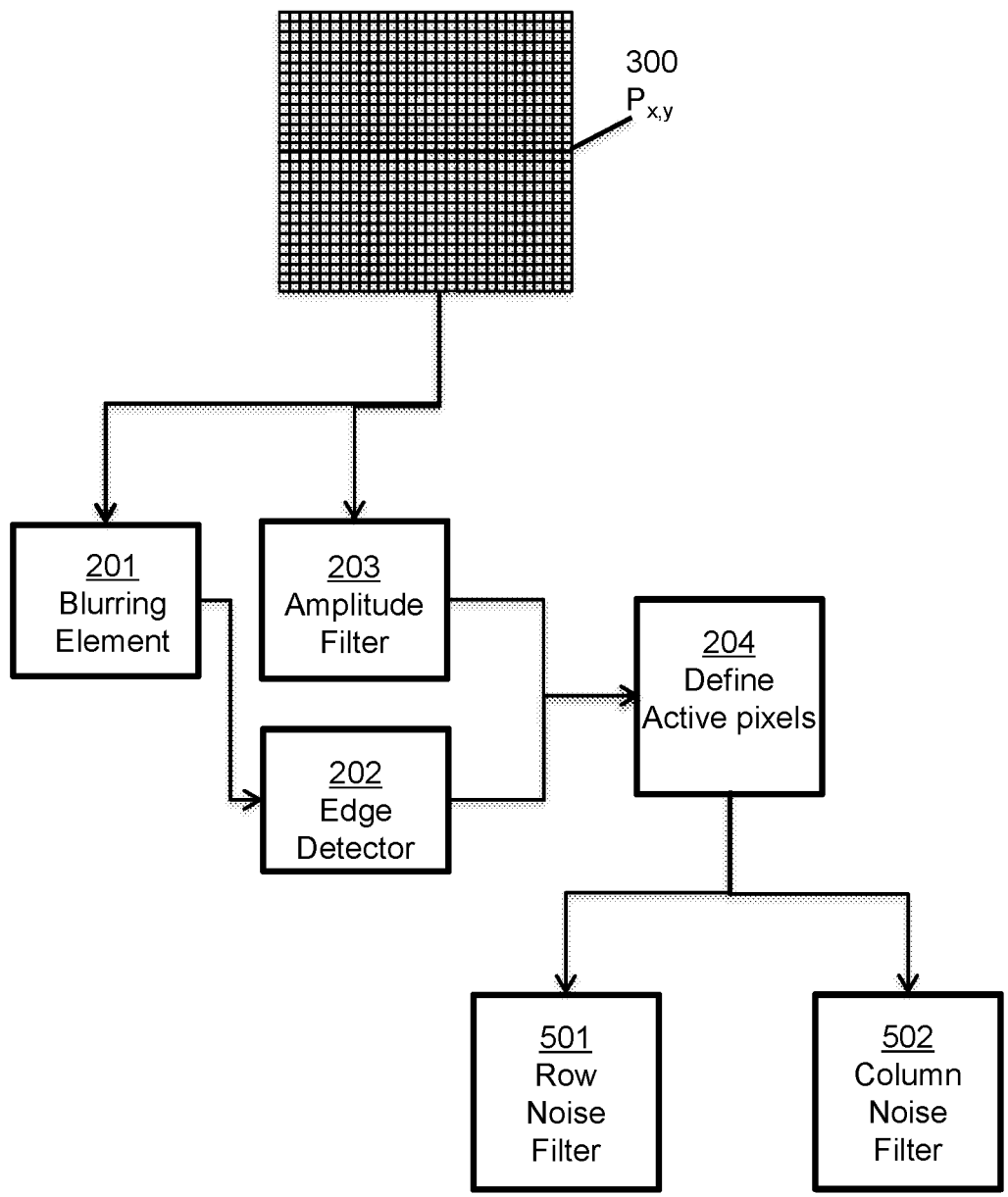
FIG. 15 illustrates using elements of the FPN reduction element for row and/or column noise reduction.

FIG. 15 shows FPN filter elements that may be applicable to Row and Column noise reduction. In particular the blurring element 201, the amplitude filter 203, the edge detector 202, and the active pixel define element 204 may all act on data from an image frame 300. Various combinations of the data from these FPN filter elements may be used in Row and Column Noise Filters 501 and 502.

Figure 16:
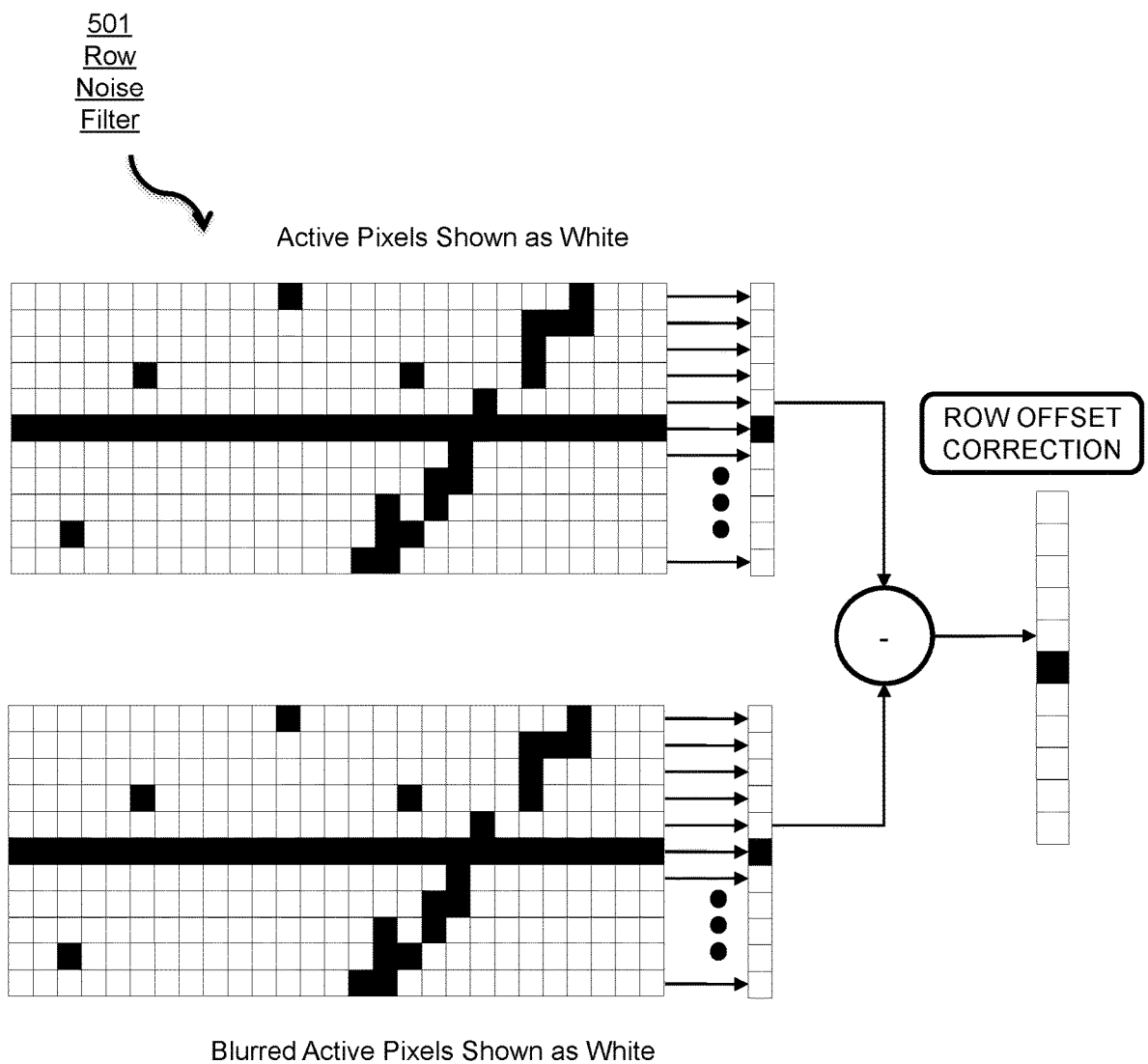
FIG. 16 illustrates an example row noise reduction element.

FIG. 16 shows operation of an example Row Noise Filter 501. A group of pixels from a frame of image data is selected. Usually this group of pixels is an entire frame, but it may also be a subset of a frame, for example, the selected group may not include pixels along or within a few pixels of the frame edges. Other subsets of a frame are possible, but in any case the selected pixels may include both complete or partial rows and columns of pixels.

The blurring element may be applied to the group of pixels, creating both a blurred and an un-blurred set of pixels. The blurring element may take a variety of forms. One possible blurring element is to apply a rolling kernel to the pixel set as described above in the description of the FPN filter elements. The center pixel of the kernel may be replaced by a function of the surrounding pixels. The function may include, for example, the mean, median or scaled versions of mean and median as well as other statistical smoothing functions. In one example, a rolling 3×3 kernel may be used with each pixel replaced by the median of the surrounding pixels to create a set of blurred pixels.

Criteria may be applied to the blurred, un-blurred, or both sets of pixels to determine an active pixel map. Pixels excluded from the active pixel map may meet certain exclusion criteria. In general, pixels are excluded that represent strongly defined image features such as peaks and edges. Therefore one or more filters may be applied, to either the blurred, un-blurred or both groups of pixels. For example, an amplitude filter and an edge filter may be applied. Active pixels would thus be defined as pixels not identified by the applied filters. Various forms of filters may be used. For instance the amplitude filter may exclude pixels whose value is more than the average pixel value by a certain amount (e.g., a predetermined threshold). One example amplitude filter is to determine if a pixel value is greater than a multiplicative product of the average pixel value multiplied by a predetermined factor, e.g., 1.2 times the average pixel value. Edge filters of various kinds may be employed, such as cross filters or high pass filters.

In a particular embodiment, an amplitude filter and a version of a cross filter are applied to the blurred pixels. Pixels identified by these filters are excluded and an active pixel map is generated. Active pixels tend to be low contrast pixels, where the contribution from row or column noise is most apparent. From this active pixel map, various operations may be performed. For instance the blurred active pixels may be subtracted from the un-blurred active pixels and a row by row or column by column smoothing operation such as mean, median, or the like may be performed on the difference to create a row or column noise offset correction term. Conversely, the row or column smoothing, e.g. mean, median etc., may be performed on a row by row or column by column basis, and the row or column smoothed result of the blurred pixels may be subtracted from the corresponding row or column smoothed results to create a row or column noise offset correction term.

In a particular embodiment, each active blurred pixel is subtracted from the corresponding un-blurred active pixel. A row and/or column noise average is created for each column and/or row set of differences. The row/column average of differences is the offset correction term for each row or column.

Figure 17:
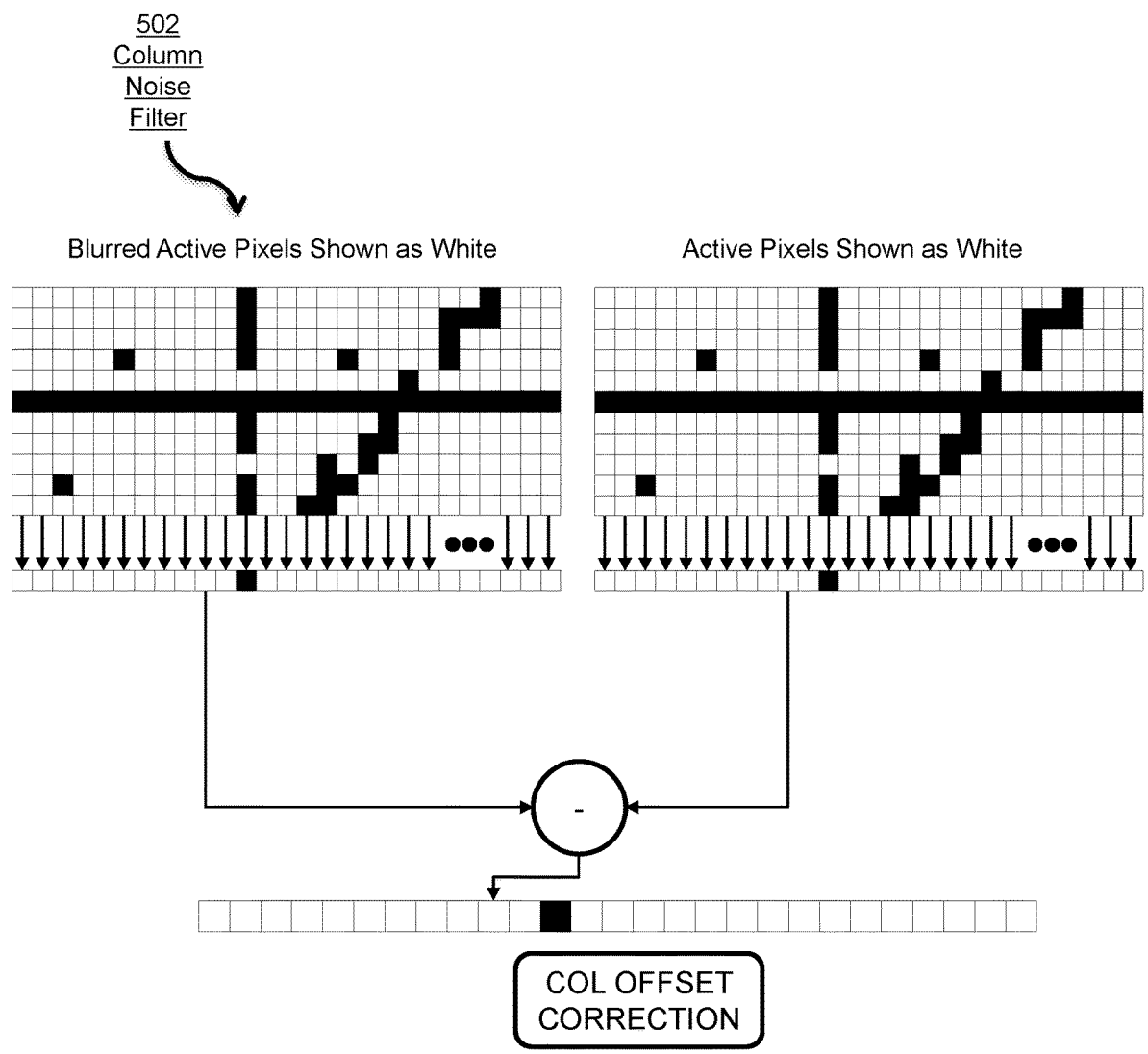
FIG. 17 illustrates an example column noise reduction.

As shown in FIG. 17 the filter for columns may be similar to the filter for rows. However since many FPA readouts read out rows in sequential order, an efficient use of memory may be to process a sub group of rows i.e. 20 rows at a time so that each column only contains a subgroup i.e. 20 pixels of the entire column. In this implementation, filter operations may be performed on rolling subsets of the pixels in the column, corresponding to the rolling readout row groupings.

For rows or columns with a large number of excluded pixels, it may be desirable to not perform the filter on such rows, i.e. the entire row or column may deemed to be excluded. For instance if 20% of a given row or column are excluded pixels, that row or column may be excluded.

Once the offset correction term is created, it may be applied by subtracting it from every corresponding row and/or column pixel in the selected group (e.g. frame or subframe). These row/column filters may be applied either alone or in conjunction with the FPN filter.

Figure 18:
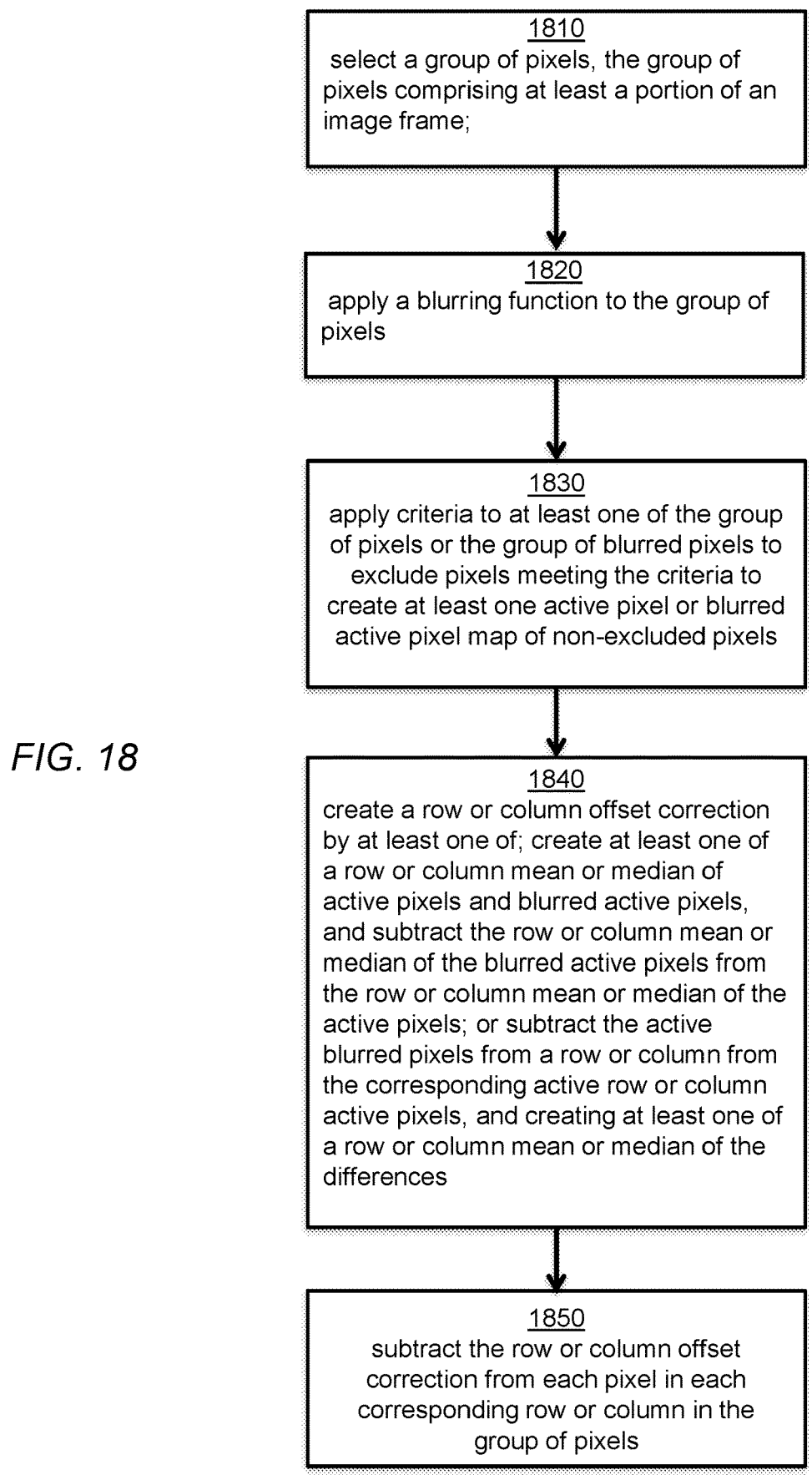
FIG. 18 illustrates a flow chart of an example embodiment of a method for row and column noise reduction.

FIG. 18 illustrates a flow chart of an example embodiment of a method for row and column noise reduction. The method begins at block 1810, in which a group of pixels is selected. The group of pixels may comprise at least a portion of an image frame. At block 1820, a blurring function is applied to the group of pixels as described above to generate a group of blurred pixels.

At block 1830, criteria are applied as described above to at least one of the group of pixels or the group of blurred pixels to exclude pixels meeting the criteria to create at least one active pixel or blurred active pixel map of non-excluded pixels.

At block 1840, a row or column offset correction is created. The row or column offset correction can be created by creating at least one of a row or column mean or median of active pixels and blurred active pixels, and subtracting the row or column mean or median of the blurred active pixels from the row or column mean or median of the active pixels. In another example, the row or column offset correction can be created by subtracting the active blurred pixels from a row or column from the corresponding active row or column active pixels, and creating at least one of a row or column mean or median of the differences.

At block 1850, the row or column offset correction created at block 1840 is subtracted from each pixel in each corresponding row or column in the group of pixels.

Depending on the embodiment, certain acts, events, or functions of any of the algorithms described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a processor configured with specific instructions, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration. For example, the LUT described herein may be implemented using a discrete memory chip, a portion of memory in a microprocessor, flash, EPROM, or other types of memory.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. A software module can comprise computer-executable instructions which cause a hardware processor to execute the computer-executable instructions.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

The terms "about" or "approximate" and the like are synonymous and are used to indicate that the value modified by the term has an understood range associated with it, where the range can be ±20%, ±15%, ±10%, ±5%, or ±1%. The term "substantially" is used to indicate that a result (e.g., measurement value) is close to a targeted value, where close can mean, for example, the result is within 80% of the value, within 90% of the value, within 95% of the value, or within 99% of the value.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to illustrative embodiments, it will be understood that various omissions, substitutions, and changes in the form and details of the devices or algorithms illustrated can be made without departing from the spirit of the disclosure. As will be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A method for reducing at least one of Row Noise and Column Noise in an imaging system including at least one imaging sensor and associated image signal processing chain, wherein successive frames of image pixel data are generated and passed to the image signal processing chain, wherein the image frame is arranged as a rectilinear array of rows and columns of pixels, the method comprising:
   selecting a group of pixels, the group of pixels comprising at least a portion of an image frame;
   applying a blurring function to the group of pixels to generate a group of blurred pixels;
   applying criteria to at least one of the group of pixels or the group of blurred pixels to exclude pixels meeting the criteria to create at least one active pixel or blurred active pixel map of non-excluded pixels;
   creating a row or column offset correction by at least one of:
      creating at least one of a row or column mean or median of active pixels and blurred active pixels, and subtracting the row or column mean or median of the blurred active pixels from the row or column mean or median of the active pixels; or
      subtracting the active blurred pixels from a row or column from the corresponding active row or column active pixels, and creating at least one of a row or column mean or median of the differences; and
   subtracting the row or column offset correction from each pixel in each corresponding row or column in the group of pixels.

2. The method of claim 1, wherein the blurring comprises:
   applying a rolling kernel to the pixels; and
   replacing a center pixel of each kernel of the rolling kernel with a pixel value derived from nearest neighbor pixels of the center pixel to create a blurred pixel.

3. The method of claim 2, wherein creating the blurred pixel comprises calculating at least one of a mean, a median, a scaled mean, or a scaled median of the nearest neighbor pixels.

4. The method of claim 3, wherein the kernel is a 3×3 kernel and the blurred pixel is the median of the 8 pixels adjacent the center pixel in each kernel.

5. The method of claim 1, wherein applying the criteria comprises at least one of:
   executing an amplitude filter on at least one of the group of pixels or the group of blurred pixels and excluding pixels above a predetermined amplitude; or
   executing an edge filter on at least one of the group of pixels or the group of blurred pixels and excluding pixels whose edge filter results exceed a predetermined value.

6. The method of claim 5, wherein the edge filter comprises at least one of a high-pass filter or a cross filter.

7. The method of claim 6, wherein the amplitude filter comprises eliminating all pixels having a value greater than 1.2 times the average of at least one of the group of pixels or the group of blurred pixels.

8. The method of claim 1, wherein any row or column with less than a predetermined number of active pixels is excluded.

9. The method of claim 8, wherein the predetermined number is 4.

10. The method of claim 1, wherein the imaging system is a thermal imaging system.

11. An imaging system including at least one imaging sensor and associated image signal processing chain, wherein successive frames of image pixel data are generated and passed to the image signal processing chain, wherein the image frame is arranged as a rectilinear array of rows and columns of pixels, configured to:
   select a group of pixels, the group of pixels comprising at least a portion of an image frame;
   apply a blurring function to the group of pixels to generate a group of blurred pixels;
   apply criteria to at least one of the group of pixels or the group of blurred pixels to exclude pixels meeting the criteria to create at least one active pixel or blurred active pixel map of non-excluded pixels;
   create a row or column offset correction by at least one of:
      creating at least one of a row or column mean or median of active pixels and blurred active pixels, and subtracting the row or column mean or median of the blurred active pixels from the row or column mean or median of the active pixels; or
      subtracting the active blurred pixels from a row or column from the corresponding active row or column active pixels, and creating at least one of a row or column mean or median of the differences; and
   subtract the row or column offset correction from each pixel in each corresponding row or column in the group of pixels to reduce at least one of Row Noise and Column Noise.

12. The system of claim 11, further configured to:
   apply a rolling kernel to the pixels; and
   replace a center pixel of each kernel of the rolling kernel with a pixel value derived from nearest neighbor pixels of the center pixel to create a blurred pixel.

13. The system of claim 12, further configured to calculate at least one of a mean, a median, a scaled mean, or a scaled median of the nearest neighbor pixels.

14. The system of claim 13, wherein the kernel is a 3×3 kernel and the blurred pixel is the median of the 8 pixels adjacent the center pixel in each kernel.

15. The system of claim 1, further configured to at least one of:
   execute an amplitude filter on at least one of the group of pixels or the group of blurred pixels and exclude pixels above a predetermined amplitude; or
   execute an edge filter on at least one of the group of pixels or the group of blurred pixels and exclude pixels whose edge filter results exceed a predetermined value.

16. The system of claim 15, wherein the edge filter comprises at least one of a high-pass filter or a cross filter.

17. The system of claim 15, wherein the amplitude filter comprises eliminating all pixels having a value greater than 1.2 times the average of at least one of the group of pixels or the group of blurred pixels.

18. The system of claim 11, wherein any row or column with less than a predetermined number of active pixels is excluded.

19. The system of claim 18, wherein the predetermined number is 4.

20. The system of claim 1, wherein the imaging system is a thermal imaging system.

* * * * *

UNITED STATES PATENT AND TRADEMARK OFFICE
CERTIFICATE OF CORRECTION

PATENT NO. : 10,867,371 B2
APPLICATION NO. : 16/195593
DATED : December 15, 2020
INVENTOR(S) : Ross Williams et al.

Page 1 of 1

It is certified that error appears in the above-identified patent and that said Letters Patent is hereby corrected as shown below:

In the Claims

In Column 24, Line 46 (Approx.), Claim 15, delete "The system of claim 1" and insert --The system of Claim 11--.

In Column 24, Line 64 (Approx.), Claim 20, delete "The system of claim 1" and insert --The system of Claim 11--.

Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*